US012621706B2

(12) United States Patent
Uchino et al.

(10) Patent No.: US 12,621,706 B2
(45) Date of Patent: May 5, 2026

(54) BUFFERING TECHNIQUES FOR NON-TERRESTRIAL NETWORKS

(71) Applicant: QUALCOMM Incorporated, San Diego, CA (US)

(72) Inventors: Toru Uchino, Zushi (JP); Alberto Rico Alvarino, San Diego, CA (US); Umesh Phuyal, San Diego, CA (US); Bharat Shrestha, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 64 days.

(21) Appl. No.: 17/590,502

(22) Filed: Feb. 1, 2022

(65) Prior Publication Data

US 2023/0247477 A1 Aug. 3, 2023

(51) Int. Cl.
*H04W 28/02* (2009.01)
*H04B 7/185* (2006.01)
*H04L 47/283* (2022.01)

(52) U.S. Cl.
CPC ........ *H04W 28/0278* (2013.01); *H04B 7/185* (2013.01); *H04B 7/18558* (2013.01); *H04L 47/283* (2013.01)

(58) Field of Classification Search
None
See application file for complete search history.

(56) References Cited

U.S. PATENT DOCUMENTS

| | | | | |
|---|---|---|---|---|
| 8,023,489 B2* | 9/2011 | Schiff | ................. | H04B 7/1858 |
| | | | | 370/465 |
| 10,506,483 B1* | 12/2019 | Williamson | ....... | H04B 7/18584 |
| 11,349,559 B1* | 5/2022 | Reuss | ................ | H04B 7/18513 |
| 2017/0265190 A1* | 9/2017 | Marjelund | ............ | H04W 72/21 |
| 2020/0295824 A1 | 9/2020 | Charbit et al. | | |
| 2021/0029658 A1* | 1/2021 | Mahalingam | ........ | H04B 7/1851 |
| 2021/0344413 A1* | 11/2021 | Gao | ...................... | H04W 24/02 |

(Continued)

FOREIGN PATENT DOCUMENTS

| | | | |
|---|---|---|---|
| EP | 4152811 | * | 5/2021 |
| WO | WO2018149228 | * | 8/2018 |

(Continued)

OTHER PUBLICATIONS

3GPP TS 38.306 V16.7.0 (Dec. 2021). User Equipment (UE) radio access capabilities (Release 16) (Year: 2021).*

(Continued)

*Primary Examiner* — Andre Tacdiran
(74) *Attorney, Agent, or Firm* — Holland & Hart LLP

(57) ABSTRACT

Methods, systems, and devices for wireless communications are described. A user equipment (UE) may be configured to buffer communications with a network node. A buffer size of a buffer used to buffer the communications may be specific to a non-terrestrial network (NTN) via which the UE communicates with the network node. For example, the UE may calculate the buffer size based on a maximum data rate of a connection with the network node via the NTN and a radio link control (RLC) round trip time (RTT). The RLC RTT may be specific to NTNs. The UE may use a buffer having the calculated buffer size to buffer the communications between the UE and the network node over the connection.

28 Claims, 12 Drawing Sheets

(56) References Cited

U.S. PATENT DOCUMENTS

| | | | |
|---|---|---|---|
| 2022/0216950 A1* | 7/2022 | You | H04L 1/1812 |
| 2022/0330187 A1* | 10/2022 | Cheng | H04W 56/004 |
| 2023/0088374 A1* | 3/2023 | Huang | H04W 28/0278 |
| | | | 370/235 |
| 2023/0199680 A1* | 6/2023 | Leng | G01S 19/25 |
| | | | 370/503 |
| 2023/0261701 A1* | 8/2023 | Wang | H04B 7/18517 |
| | | | 375/262 |
| 2023/0337289 A1* | 10/2023 | Li | H04W 74/002 |
| 2023/0350078 A1* | 11/2023 | Cozzo | G01S 19/31 |
| 2023/0397247 A1* | 12/2023 | Jung | H04B 7/18519 |
| 2023/0403068 A1* | 12/2023 | Hu | H04B 7/1851 |

FOREIGN PATENT DOCUMENTS

| | | | |
|---|---|---|---|
| WO | WO2021164579 | * | 8/2021 |
| WO | WO-2021228252 A1 | | 11/2021 |

OTHER PUBLICATIONS

Leng.—U.S. Appl. No. 63/312,622 Provisional Application (Year: 2022).*
Cheng—U.S. Appl. No. 63/169,140 Provisional (Year: 2021).*
Huawei, et al., "Further Discussion on RLC/PDCP Impacts in NTN", 3GPP TSG-RAN WG2 Meeting #105, R2-1901207, 3rd Generation Partnership Project (3GPP), Mobile Competence Centre, 650, Route Des Lucioles, F-06921 Sophia-Antipolis Cedex, vol. RAN WG2, No. Athens, Greece, Feb. 25, 2019-Mar. 1, 2019, Feb. 15, 2019 (Feb. 15, 2019), 3 Pages, XP051602566, Sections 1 and 2.
Intel Corporation: "L2 Buffer Size Capability", 3GPP TSG-RAN WG2 Meeting #102, R2-1807332 (Revision of R2-1805027), 3rd Generation Partnership Project (3GPP), Mobile Competence Centre, 650, Route Des Lucioles, F-06921 Sophia-Antipolis Cedex, France, vol. RAN WG2, No. Busan, South Korea, May 21, 2018-May 25, 2018, 9 Pages, May 11, 2018 (May 11, 2018), XP051464583, Section 2.
International Search Report and Written Opinion—PCT/US2023/061452—ISA/EPO—Apr. 21, 2023.

* cited by examiner

510

520

515

505

500

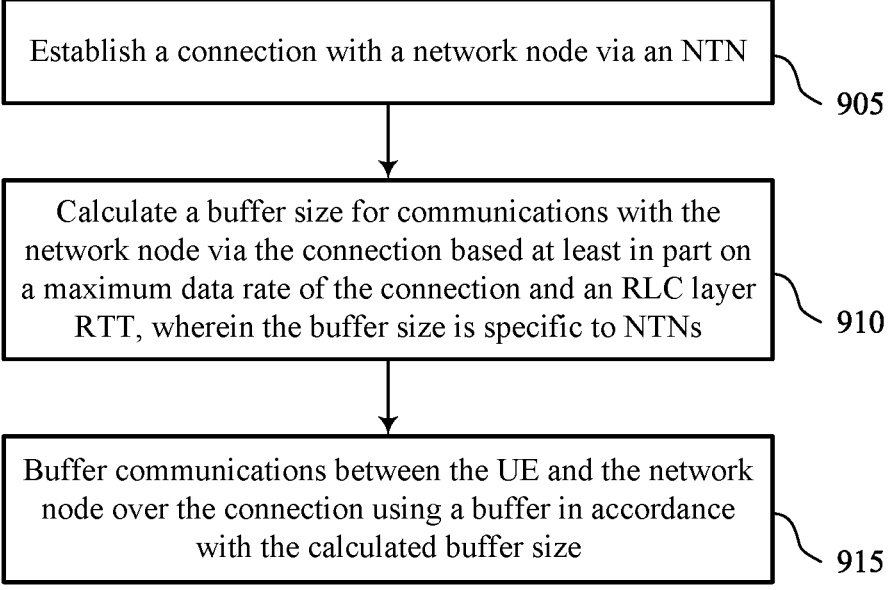

Establish a connection with a network node via an NTN

905

Calculate a buffer size for communications with the network node via the connection based at least in part on a maximum data rate of the connection and an RLC layer RTT, wherein the buffer size is specific to NTNs

910

Buffer communications between the UE and the network node over the connection using a buffer in accordance with the calculated buffer size

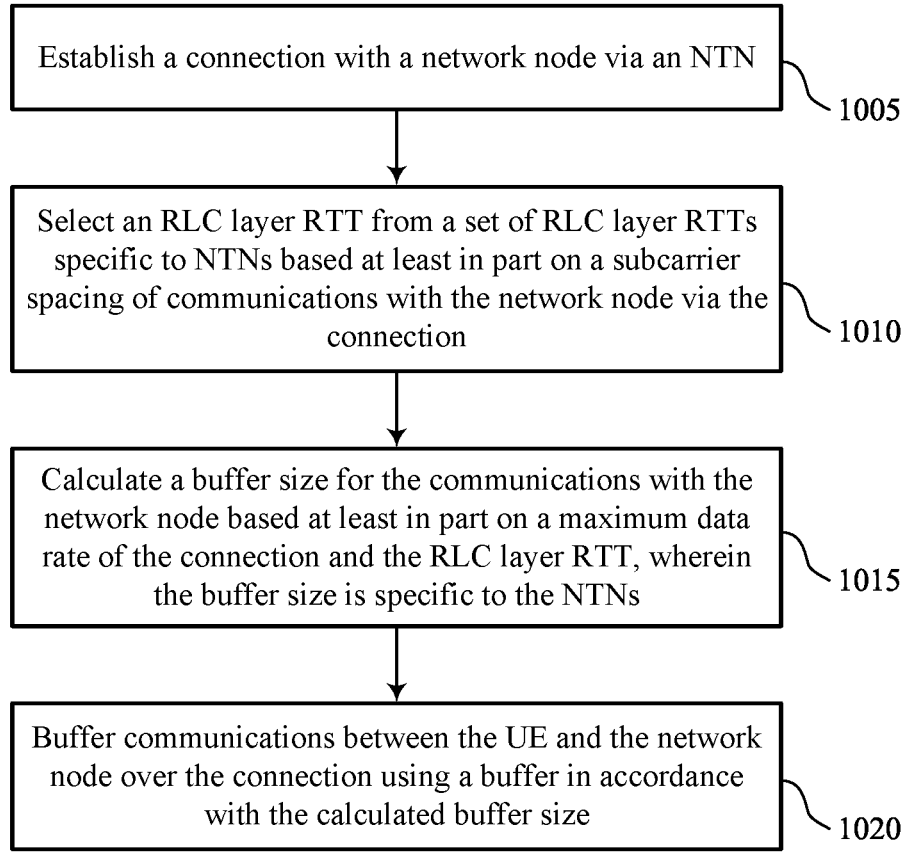

Establish a connection with a network node via an NTN

1005

Select an RLC layer RTT from a set of RLC layer RTTs specific to NTNs based at least in part on a subcarrier spacing of communications with the network node via the connection

1010

Calculate a buffer size for the communications with the network node based at least in part on a maximum data rate of the connection and the RLC layer RTT, wherein the buffer size is specific to the NTNs

1015

Buffer communications between the UE and the network node over the connection using a buffer in accordance with the calculated buffer size

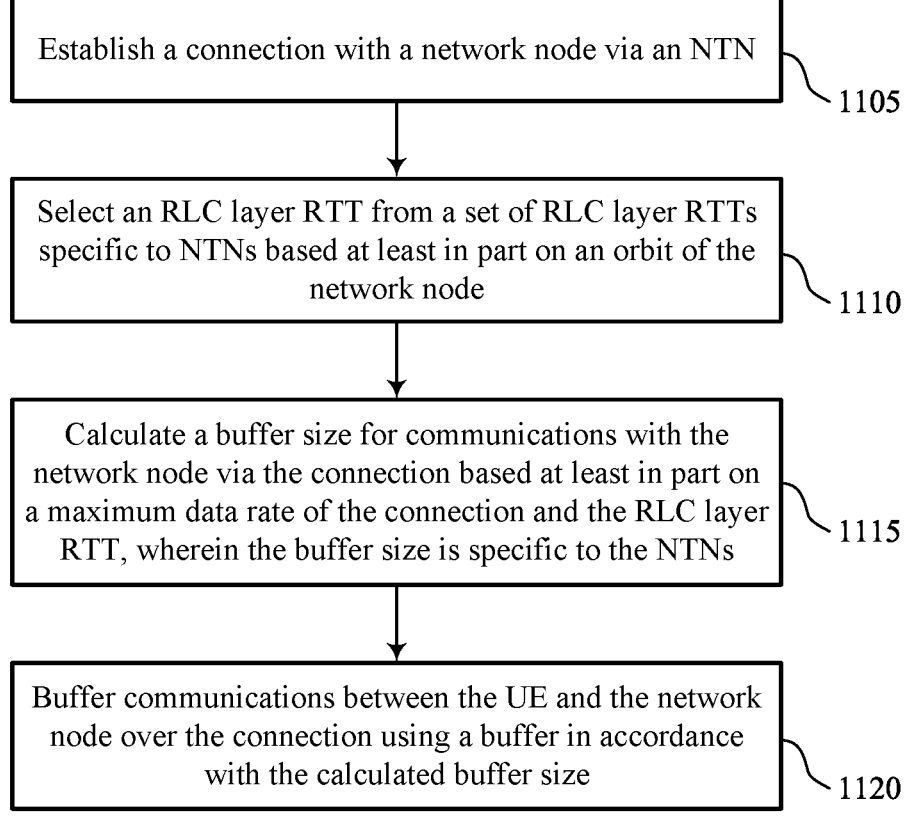

Establish a connection with a network node via an NTN

1105

Select an RLC layer RTT from a set of RLC layer RTTs specific to NTNs based at least in part on an orbit of the network node

1110

Calculate a buffer size for communications with the network node via the connection based at least in part on a maximum data rate of the connection and the RLC layer RTT, wherein the buffer size is specific to the NTNs

1115

Buffer communications between the UE and the network node over the connection using a buffer in accordance with the calculated buffer size

BUFFERING TECHNIQUES FOR NON-TERRESTRIAL NETWORKS

FIELD OF TECHNOLOGY

The following relates to wireless communications, including buffering techniques for non-terrestrial networks (NTNs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may buffer data communicated between the UE and a network node. In some examples, the UE may communicate with the network node via a non-terrestrial network (NTN). Improved techniques for buffering data communicated via an NTN may be desired.

SUMMARY

The described techniques relate to improved methods, systems, devices, and apparatuses that support buffering techniques for non-terrestrial networks (NTNs). Generally, the described techniques enable buffer management for data communicated between a UE and a network node via an NTN. For example, a UE may establish a connection with a network node via an NTN (e.g., establish the connection via an NTN node, such as a satellite or a high-altitude platform station (HAPS), among other types of NTN nodes). The UE may be configured to buffer NTN communications between the network node and the UE over the connection using a buffer, such as a layer 2 buffer. A size of the buffer may be specific to NTNs to support buffering of the NTN communications. For example, the UE may calculate the buffer size using a maximum data rate of the connection and a radio link control (RLC) round trip time (RTT) that is specific to NTNs. In some examples, the RLC RTT specific to NTNs may be greater than an RLC RTT that is specific to terrestrial networks (e.g., terrestrial network communications between a UE and a terrestrial base station). Using the RLC RTT specific to NTNs may result in a larger buffer size compared to a buffer size calculated using the RLC RTT specific to terrestrial networks, which may prevent or reduce memory overflow of buffered NTN communications.

A method for wireless communication at a UE is described. The method may include establishing a connection with a network node via a NTN, calculating a buffer size for communications with the network node via the connection based on a maximum data rate of the connection and an RLC layer RTT, where the buffer size is specific to NTNs, and buffering communications between the UE and the network node over the connection using a buffer in accordance with the calculated buffer size.

An apparatus for wireless communication at a UE is described. The apparatus may include a processor, memory coupled with the processor, and instructions stored in the memory. The instructions may be executable by the processor to cause the apparatus to establish a connection with a network node via a NTN, calculate a buffer size for communications with the network node via the connection based on a maximum data rate of the connection and an RLC layer RTT, where the buffer size is specific to NTNs, and buffer communications between the UE and the network node over the connection using a buffer in accordance with the calculated buffer size.

Another apparatus for wireless communication at a UE is described. The apparatus may include means for establishing a connection with a network node via a NTN, means for calculating a buffer size for communications with the network node via the connection based on a maximum data rate of the connection and an RLC layer RTT, where the buffer size is specific to NTNs, and means for buffering communications between the UE and the network node over the connection using a buffer in accordance with the calculated buffer size.

A non-transitory computer-readable medium storing code for wireless communication at a UE is described. The code may include instructions executable by a processor to establish a connection with a network node via a NTN, calculate a buffer size for communications with the network node via the connection based on a maximum data rate of the connection and an RLC layer RTT, where the buffer size is specific to NTNs, and buffer communications between the UE and the network node over the connection using a buffer in accordance with the calculated buffer size.

Some examples of the method, apparatuses, and non-transitory computer-readable medium described herein may further include operations, features, means, or instructions for selecting the RLC layer RTT from a set of RLC layer RTTs specific to the NTNs based on a subcarrier spacing of the communications with the network node or a subcarrier spacing group associated with the communications with the network node, where the buffer size may be calculated based on selecting the RLC layer RTT.

Some examples of the method, apparatuses, and non-transitory computer-readable medium described herein may further include operations, features, means, or instructions for selecting the RLC layer RTT from a set of RLC layer RTTs specific to the NTNs based on an orbit of the network node or an orbit group associated with the network node, where the buffer size may be calculated based on selecting the RLC layer RTT.

Some examples of the method, apparatuses, and non-transitory computer-readable medium described herein may further include operations, features, means, or instructions for selecting a second RLC layer RTT from a set of RLC layer RTTs specific to terrestrial networks based on a subcarrier spacing of the communications with the network node or a subcarrier spacing group associated with the communications with the network node, selecting an offset from a set of offsets specific to the NTNs based on an orbit of the network node or an orbit group associated with the network node, and calculating the RLC layer RTT using the second RLC layer RTT and the offset, where the buffer size may be calculated based on calculating the RLC layer RTT.

Some examples of the method, apparatuses, and non-transitory computer-readable medium described herein may further include operations, features, means, or instructions for selecting a second RLC layer RTT from a set of RLC layer RTTs specific to terrestrial networks based on a subcarrier spacing of the communications with the network node or a subcarrier spacing group associated with the communications with the network node, selecting a scalar from a set of scalars specific to the NTNs based on an orbit of the network node or an orbit group associated with the network node, and calculating the RLC layer RTT using the second RLC layer RTT and the scalar, where the buffer size may be calculated based on calculating the RLC layer RTT.

In some examples of the method, apparatuses, and non-transitory computer-readable medium described herein, the scalar may be associated with a HARQ RTT associated with the orbit of the network node or the orbit group associated with the network node.

Some examples of the method, apparatuses, and non-transitory computer-readable medium described herein may further include operations, features, means, or instructions for calculating the RLC layer RTT using a second RLC layer RTT specific to terrestrial networks, an offset specific to the NTNs, and a scalar specific to the NTNs.

In some examples of the method, apparatuses, and non-transitory computer-readable medium described herein, the communications between the UE and the network node include communications according to a carrier aggregation for a set of serving cells associated with a set of network nodes of the NTN including the network node, each network node of the set of network nodes associated with a respective RLC layer RTT and the RLC layer RTT used to calculate the buffer size corresponds to a largest RLC layer RTT associated with the set of network nodes.

In some examples of the method, apparatuses, and non-transitory computer-readable medium described herein, each serving cell of the set of serving cells may be associated with a respective communication latency that may be within a first range of communication latencies, each respective RLC layer RTT may be within a second range of RLC layer RTTs, or both.

Some examples of the method, apparatuses, and non-transitory computer-readable medium described herein may further include operations, features, means, or instructions for transmitting, to the network node, a capability message indicating a restriction of the carrier aggregation to serving cells associated with communication latencies within a first range of communication latencies, RLC layer RTTs within a second range of RLC layer RTTs, or both, where the carrier aggregation for the set of serving cells may be based on the restriction.

In some examples of the method, apparatuses, and non-transitory computer-readable medium described herein, the UE may be scheduled to receive data from a second set of serving cells that violate the indicated restriction and the method, apparatuses, and non-transitory computer-readable medium may include further operations, features, means, or instructions for discarding the received data based on the violation of the indicated restriction and transmitting, to the network node, an indication of the violation of the indicated restriction via an RLC layer negative acknowledgement (NACK) or a radio link failure message.

In some examples of the method, apparatuses, and non-transitory computer-readable medium described herein, the buffer size may be further calculated based on a delay associated with communications between base stations in the NTN.

Some examples of the method, apparatuses, and non-transitory computer-readable medium described herein may further include operations, features, means, or instructions for transmitting a capability message indicating an orbit of the network node that may be supported by the UE, an orbit group associated with the network node that may be supported by the UE, a latency of communications with the network node that may be supported by the UE, or a combination thereof, where the connection may be established with the network node based on the capability message.

In some examples of the method, apparatuses, and non-transitory computer-readable medium described herein, the RLC layer RTT may be based on an orbit of the network node, the orbit of the network node including a geosynchronous orbit (GSO), a non-GSO, a geostationary earth orbit (GEO), a high earth orbit, a medium earth orbit (MEO), a low earth orbit (LEO), a highly elliptical orbit, or an elevation of a HAPS.

In some examples of the method, apparatuses, and non-transitory computer-readable medium described herein, the buffer size may be a layer 2 buffer size and the buffer may be a layer 2 buffer.

BRIEF DESCRIPTION OF THE DRAWINGS

FIGS. 9 through 12 show flowcharts illustrating methods that support buffering techniques for NTNs in accordance with aspects of the present disclosure.

DETAILED DESCRIPTION

Figure 1:
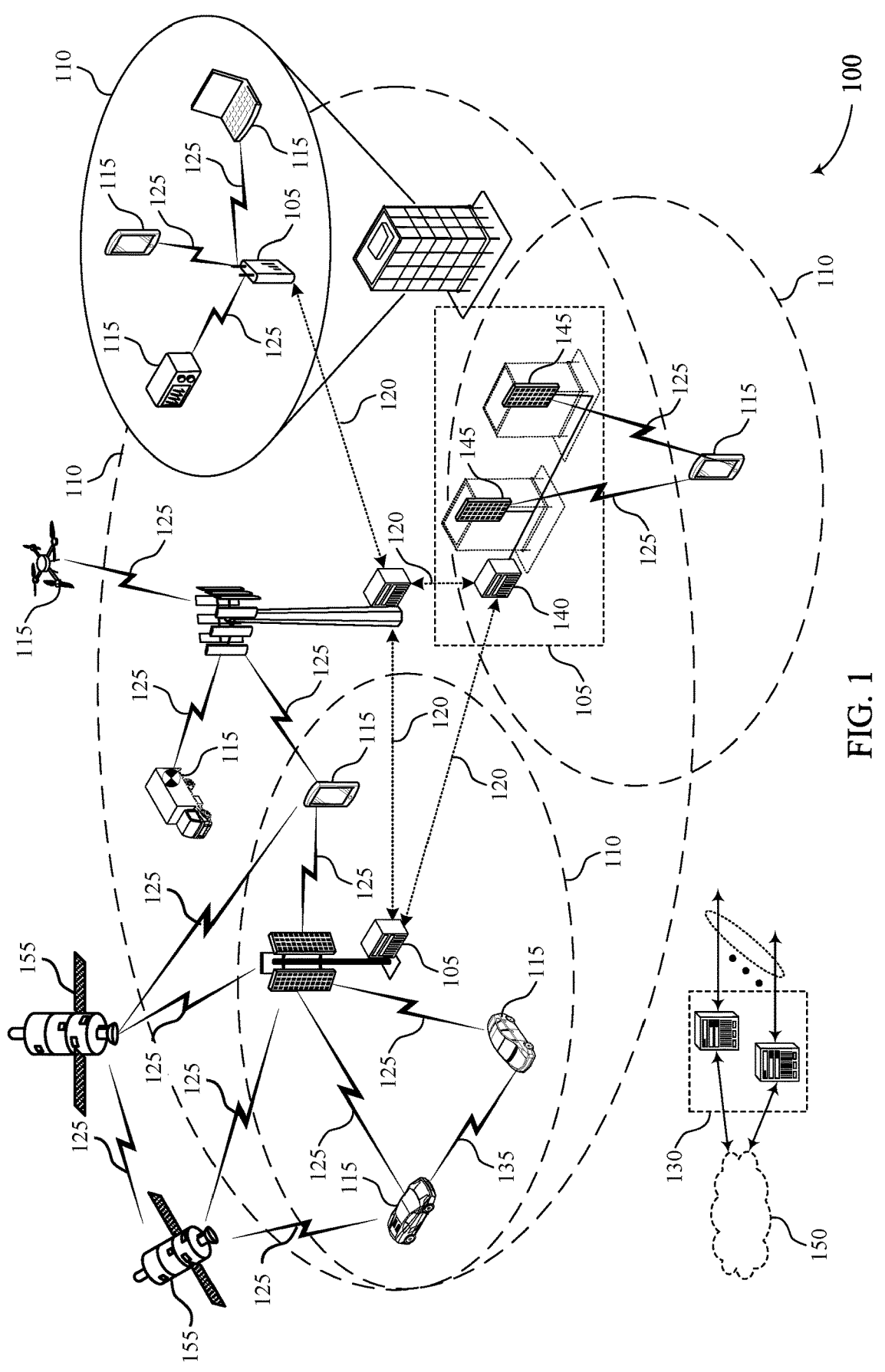
FIGS. 1, 2, and 3 illustrate examples of wireless communications systems that supports buffering techniques for non-terrestrial networks (NTNs) in accordance with aspects of the present disclosure.

Some wireless communications systems may include communication devices, such as a user equipment (UE) and a network node (e.g., a base station or a base station component), that may support multiple radio access technologies. In some examples, a UE may be configured to temporarily store data communicated with a network using a buffer, such as a layer 2 buffer. The UE may calculate a size of the buffer (e.g., a quantity of bytes that the UE may store in the buffer) in accordance with various communication parameters such as a maximum data rate of a connection between the UE and a network node, a radio link control (RLC) round trip time (RTT) associated with communicating with the network node, or a delay of communications between base stations included in the network (e.g., an Xn delay), among other communication parameters. An appropriately sized buffer may improve storage management and efficiency at the UE, for example, by enabling the UE to allocate sufficient storage for buffering to avoid memory overflow while mitigating the allocation of excess storage for buffering.

In some cases, some values for the communications parameters used in buffer size calculation may be determined (e.g., defined, calculated, selected) assuming that the UE communicates with the network via a terrestrial network. For example, the values may be determined assuming that the UE communicates with terrestrial base stations within a wireless communications system. Some wireless communications systems, however, may support non-terrestrial network (NTN) communications in which the UE may communicate with the network via an NTN node, such as a satellite, a high-altitude platform station (HAPS), a balloon, an aircraft, a drone, or an unmanned aerial vehicle, among other types of NTN nodes. In some cases, communication parameters determined assuming terrestrial network communications may be unsuitable to support proper buffering when the UE communicates within an NTN. For example, an RLC RTT may be longer when the UE communicates with the network via an NTN node. Using a smaller RLC RTT that is associated with terrestrial network communications may correspond to a smaller calculated buffer size, which may result in, for example, memory overflow due to an insufficiently small buffer size or increased latency due to a reduced communication schedule that avoids memory overflow.

Techniques, systems, and devices are described herein to enable buffer management for data communicated between a UE and a network node via an NTN. For example, the UE may establish a connection with the network node via the NTN and may support NTN communications with the network node over the connection. The UE may be configured to buffer the NTN communications using a buffer, such as a layer 2 buffer. To calculate a size of the buffer, the UE may use at least a maximum data rate of the connection (e.g., a maximum uplink data rate of the connection, a maximum downlink data rate of the connection, or both) and an RLC RTT that is specific to NTNs (e.g., associated with the NTN communications between the UE and the network node). The RLC RTT specific to NTNs may be larger than an RLC RTT that is specific to terrestrial networks, which may result in a larger calculated buffer size compared to a buffer size calculated using the RLC RTT specific to terrestrial networks. The UE may buffer the NTN communications with the network node using the buffer having the calculated buffer size.

The UE may determine the RLC RTT specific to NTNs according to various techniques. For example, the UE may select the RLC RTT from a set of RLC RTTs that are specific to NTNs based on communicating with the network node via the NTN. In some examples, the UE may select the RLC RTT from the set of RLC RTTs based on a subcarrier spacing of the NTN communications, an orbit of the network node, or a combination thereof. Alternatively, the UE may calculate the RLC RTT specific to NTNs using an RLC RTT specific to terrestrial networks and an offset specific to NTNs, a scalar specific to NTNs, or both.

Aspects of the subject matter described in this disclosure may be implemented to realize one or more of the following potential improvements, among others. The techniques employed by the described communication devices may enable the buffering of NTN communications by a UE such that memory overflow may be prevented. For example, calculating a buffer size that is specific to NTNs (e.g., using an RLC RTT that is specific to NTNs, among other NTN-specific communication parameters) may ensure that the buffer size is sufficient for buffering the NTN communications without memory overflow. Additionally, using a buffer having an NTN-specific size may reduce latency and increase scheduling flexibility. For example, the NTN-specific size of the buffer may be larger than a terrestrial network-specific size, which may enable a network to more aggressively scheduled downlink and uplink communications without memory overflow, thereby reducing latency. In some examples, calculating NTN-specific buffer sizes may improve coordination between communication devices, increase data rates, and improve data processing, among other benefits.

Aspects of the disclosure are initially described in the context of wireless communications systems. Aspects of the disclosure are additionally described in the context of a process flow. Aspects of the disclosure are further illustrated by and described with reference to apparatus diagrams, system diagrams, and flowcharts that relate to buffering techniques for NTNs.

FIG. 1 illustrates an example of a wireless communications system 100 that supports buffering techniques for NTNs in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies, such as fourth generation (4G) systems (e.g., LTE systems) and fifth generation (5G) systems (e.g., NR systems).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to base station 105, entity of a core network 130, apparatus, device, or computing system configured to perform any techniques described herein. For example, a network node may be a base station 105. As another example, a first network node may be configured to communicate with a UE 115 or a second network node. In one aspect of this example, the first network node may be a first base station 105, and the second network node may be a second base station 105 or a component of a second base station 105. In other aspects of this example, the first and second network nodes may be different. Similarly, reference to a base station 105, an apparatus, a device, or a computing system may include disclosure of the base station 105, apparatus, device, or computing system being a network node. For example, disclosure that a UE 115 is configured to receive information from a base station 105 also discloses that the UE 115 is configured to receive information from a network node. In this example, consistent with this disclosure, the network node may refer to a base station 105, an apparatus, a device, or a computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI)

may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105, satellite 155, or both, may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. An RLC layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may be an example of an NTN and support NTN communications. For example, the wireless communications system 100 may include base stations 105 that function as NTN nodes (e.g., non-terrestrial base stations). In some examples, an NTN node may communicate with base stations 105 (also referred to as gateways in NTNs) and UEs 115 (or other high altitude or terrestrial communications devices). An NTN node may be any suitable type of communication device configured to relay communications between different end nodes in a wireless communication system. In some cases, an NTN node may be an example of a space satellite, such as a satellite 155. In some cases, an NTN node may be an example of a HAPS, a balloon, a dirigible, an airplane, a drone, an unmanned aerial vehicle, and the like. In some examples, an NTN node (e.g., a satellite 155) may operate as a bent pipe satellite that forwards (e.g., relays) communications between a UE 115 and a base station 105.

In some examples, an NTN node may be in a geosynchronous orbit (GSO), geostationary earth orbit (GEO), a high earth orbit, a medium earth orbit (MEO), a low earth orbit (LEO), or a highly elliptical orbit, among other types of orbit. In some cases, an NTN node may be a multi-beam satellite configured to provide service for multiple service beam coverage areas in a predefined geographical service area.

An NTN node may be any distance away from the surface of the earth. In some examples, NTN communications may refer to wireless communications between a UE 115 and an NTN node, and terrestrial network communications may refer to wireless communications between a UE 115 and a terrestrial communication device, such as another UE 115 or a terrestrial base station 105. In some examples, NTN communications may be configured according to different protocol types (e.g., MTC, enhanced MTC (eMTC), NB-IoT, etc.) that provide access to a network (e.g., core network 130) for different types of devices via the NTN.

A UE 115 may be configured to temporarily store data communicated with a network node using a buffer. For example, the UE 115 may buffer data received from the network node, data transmitted to the network node, or both. In some examples, the UE 115 may buffer received data to enable data reassembly and reordering at the UE 115. For example, the UE 115 may receive data packets that are out-of-order with respect to a scheduling of the data packets, and buffering the data packets may enable to UE 115 to wait for the scheduled data packets to be received and reassemble the data packets according to the correct order to correctly decode the data. In some examples, the UE 115 may buffer transmitted data packets to support HARQ feedback communication and segmentation. For example, the UE 115 may buffer a transmitted data packet until an acknowledgement (ACK) is received from the network node that indicates successful reception of the data packet. If the UE 115 receives a negative ACK (NACK) corresponding the data packet or is indicated that the data packet failed to be successfully received, the UE 115 may retransmit the data packet based on buffering the data packet such that the data packet is still accessible to the UE 115 for retransmission.

In some examples, a UE 115 may implement communication buffering using a layer 2 buffer. The layer 2 buffer may support the segmentation, reassembly, and reordering of radio bearers, such as signaling radio bearers (SRBs) and data radio bearers (DRBs), among other types of radio bearers. For example, a total layer 2 buffer size may be defined in a standard or elsewhere as the sum of the number of bytes that a UE 115 is capable of storing in RLC transmission windows and RLC reception and reassembly windows and also in PDCP reordering windows for all radio bearers. Accordingly, a UE 115 may use a layer 2 buffer to buffer communications (e.g., data packets, radio bearers) within RLC transmission windows, RLC reception and reassembly windows, and PDCP reordering windows to support the segmentation, reassembly, and reordering of the buffered communications.

A UE 115 may calculate a buffer size (e.g., a total layer 2 buffer size) using various communication parameters. For example, the UE 115 may calculate the buffer size using a maximum uplink data rate of a connection with a network node, a maximum downlink data rate of the connection, an RLC RTT of communications over the connection, a delay associated with communications between base station 105 (e.g., an Xn delay, an X2/Xn delay), or a combination thereof. In some examples, the buffer size may further be based on a carrier aggregation configuration according to which the UE 115 communicates with the network node. For example, the buffer size may be calculated as the maximum buffer size of calculated buffer sizes for each band combination associated with the carrier aggregation configuration.

A UE 115 may support the buffering of NTN communications. For example, the UE 115 may be configured to calculate a buffer size that is specific to NTNs to prevent memory overflow, improve communication scheduling, and reduce latency, among other benefits. The UE 115 may calculate the buffer size (e.g., a layer 2 buffer size) using communication parameters that are specific to NTNs, such as a maximum data rate of a connection with a network node via an NTN node and an RLC RTT that is specific to NTNs (e.g., selected from a set of NTN-specific RLC RTTs, calculated using a terrestrial network-specific RLC RTT and an NTN-specific offset, an NTN-specific scalar, or both), among other NTN-specific communication parameters described herein. By calculating the buffer size using the NTN-specific communication parameters, the UE 115 may ensure that a buffer having the calculated buffer size has sufficient memory to support the buffering of the NTN communications without memory overflow.

Figure 2:
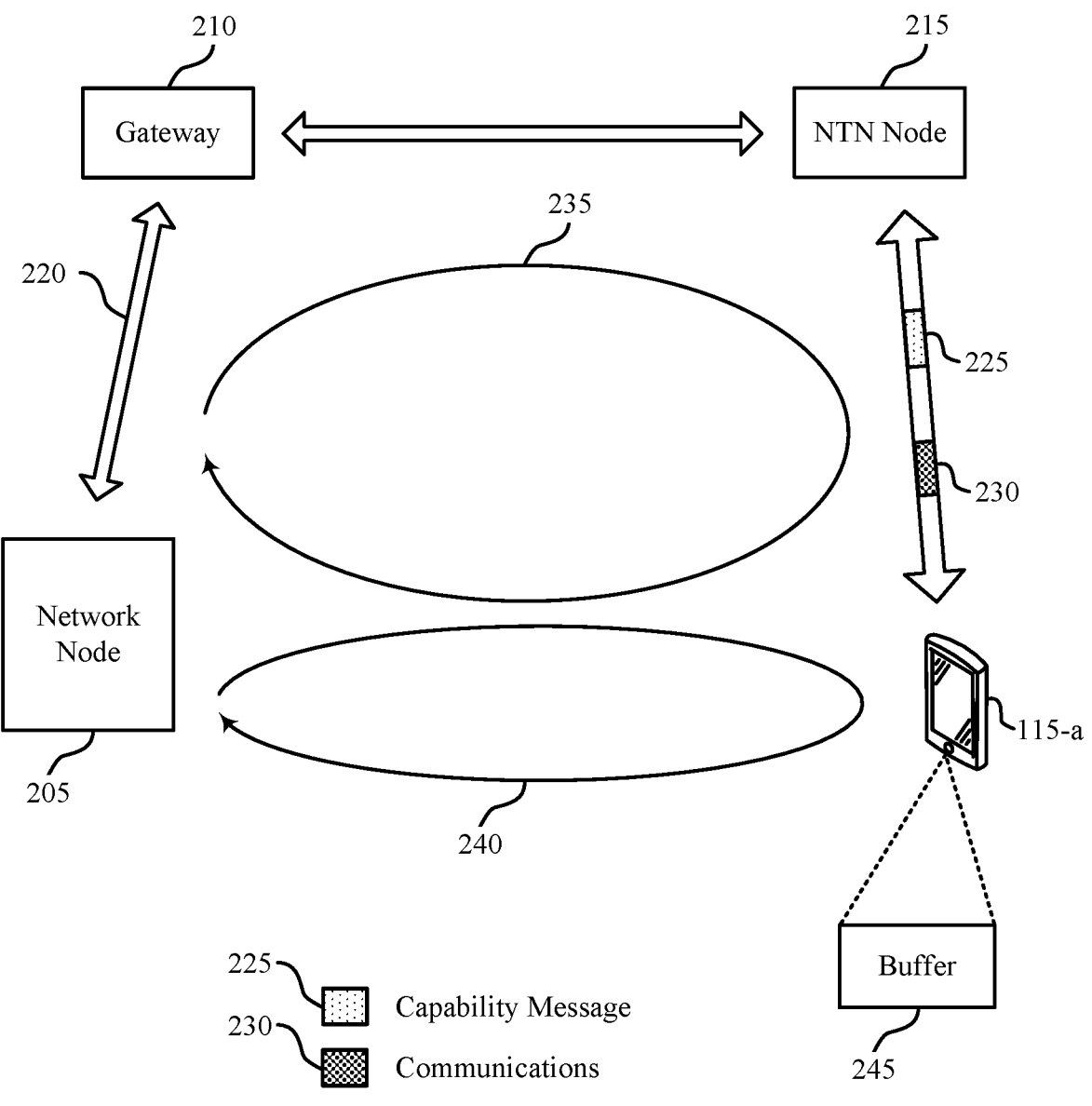

FIG. 2 illustrates an example of a wireless communications system 200 that supports buffering techniques for NTNs in accordance with aspects of the present disclosure. The wireless communications system 200 may implement or be implemented by aspects of the wireless communications system 100 described with reference to FIG. 1. For example, the wireless communications system 200 may include a network node 205 and a UE 115-a, which may be examples of the corresponding devices described with reference to FIG. 1. Additionally, the wireless communications system 200 may include a gateway 210 and an NTN node 215, which may be examples of a gateway and an NTN node described with reference to FIG. 1, respectively. The wireless communications system 200 may support NTN communication buffering to support improvements to data buffering and processing, memory overflow prevention, latency, communication scheduling, and coordination between devices, among other benefits.

The wireless communications system 200 may support communications between the wireless devices of the wireless communications system 200 via respective communication links 220, which may be examples of a communication link 125 as described with reference to FIG. 1. For example, the wireless communications system 200 may support communications, via respective communication links 220, between the network node 205 and the gateway 210, between the gateway 210 and the NTN node 215, and between the NTN node 215 and the UE 115-a. In some examples, a communication link 220 between the network node 205 and the gateway 210 may be an example of a backhaul link 120 described with reference to FIG. 1. In some examples, the network node 205 may be an example of a base station 105 described with reference to FIG. 1 In some cases, the wireless communications system 200 may also support communications (e.g., terrestrial network communications) between the UE 115-a and the network node 205 via a respective communication link 220 (not shown).

The wireless communications system 200 may enable the UE 115-a to access a network (e.g., a core network 130) via an NTN. For example, the network node 205 may provide access to the network and communications 230 between the UE 115-a and the network node 205 may be routed through the gateway 210 and the NTN node 215. Accordingly, the communications 230 between the UE 115-a and the network node 205 via the NTN may constitute NTN communications. The gateway 210 may provide an interconnect between the NTN node 215 and the network node 205. For example, the gateway 210 may receive communications from the network node 205 and may transmit the communications to the NTN node 215. Additionally or alternatively, the gateway 210 may receive communications from the NTN node 215 and may forward (e.g., transmit, route) the communications to the network node 205. In some examples, the network node 205 may operate as a gateway 210 and may communicate directly with the NTN node 215.

To access the network, the UE 115-a may establish a connection with the network node 205 via the NTN. For example, the UE 115-a may communicate control signaling (e.g., as part of a random access channel (RACH) procedure) with the network node 205 via the NTN node 215 to configure and indicate communication parameters according to which the UE 115-a and the network node 205 may communicate via the NTN node 215.

The UE 115-a may be configured to buffer the communications 230 with the network node 205 using a buffer 245, which may be an example of a layer 2 buffer as described herein. The communications 230 may correspond to the control signaling, information, data, packets, radio bearers, and the like, that are exchanged between the UE 115-a and the network node 205 via the NTN node 215. The UE 115-a may buffer (e.g., temporarily store) the communications 230 using the buffer 245, for example, to support segmentation, reassembly, reordering, and feedback communication for the communications 230.

The UE 115-a may be configured to calculate a size of the buffer 245 (e.g., a number of bytes that the UE 115-a is capable of storing in the buffer 245). To support buffering of the communications 230 without memory overflow, the UE 115-a may calculate the size of the buffer 245 to be specific to the NTN via which the UE 115-a and the network node 205 communicate. For example, the UE 115-a may calculate the size of the buffer 245 using NTN-specific communication parameters, such as a maximum data rate of the connection with the network node 205 via the NTN and an RLC RTT 235 that is specific to the NTN. In some examples, the UE 115-a may calculate the size of the buffer 245 before the connection is established with the network node 205. For example, the size of the buffer 245 may be standardized. Additionally, or alternatively, the UE 115-a may calculate the size of the buffer 245 during establishment of the connection or after the connection has been established.

An RLC RTT may correspond to a time it takes for a message to be transmitted to a destination plus the time it takes for a feedback message corresponding to the message (e.g., an ACK or a NACK corresponding to the message) to be received at the transmission point. Accordingly, the NTN-specific RLC RTT 235 may correspond to the time it takes for a communication 230 and a feedback message corresponding to the communication 230 to be communicated between the network node 205 and the UE 115-a via the NTN node 215.

In some examples, the RLC RTT 235 may be greater than an RLC RTT 240 that is specific to terrestrial networks (e.g., corresponding to terrestrial communications between the UE 115-a and the network node 205). For example, messages communicated between an NTN node 215 and a UE 115 may take relatively longer to propagate over the air than messages communicated between a network node 205 and a UE 115 due to a distance between the NTN node 215 and the UE 115 being greater than a distance between the network node 205 and the UE 115. Accordingly, an RLC RTT 235 of a message communicated at a first subcarrier spacing between the network node 205 and the UE 115-a via the NTN node 215 may be greater than an RLC RTT 240 of a message communicated at the first subcarrier spacing between the network node 205 and the UE 115-a via a terrestrial network. As a result, a size of the buffer 245 that is calculated using the RLC RTT 235 may be larger than a size of the buffer 245 that is calculated using the RLC RTT 240. The larger calculated size of the buffer 245 may enable the UE 115-a to buffer the communications 230 without memory overflow and may improve scheduling (e.g., improve scheduling flexibility and enable increased message density) of the communications 230.

The UE 115-a may determine the RLC RTT 235 according to various methods. For example, the UE 115-a may select the RLC RTT 235 from a set of RLC RTTs that are specific to NTNs. The set of RLC RTTs may include RLC RTTs according to various levels of granularity. For example, the set of RLC RTTs may include NTN-specific RLC RTTs that each correspond to a respective subcarrier spacing according to which the UE 115-a may communicate with the network node 205 (e.g., a subcarrier spacing of the communications 230). An example of a set of RLC RTTs at the subcarrier spacing level of granularity that includes an NTN-specific RLC RTT in milliseconds for four subcarrier spacings in kilohertz (kHz) is depicted in Table 1 below, although any quantity of NTN-specific RLC RTTs corresponding to respective subcarrier spacings may be included in the set of RLC RTTs.

TABLE 1

| Subcarrier Spacing (KHz) | RLC RTT for NTN (milliseconds) |
|---|---|
| 15 kHz | 200 |
| 30 kHz | 190 |
| 60 kHz | 180 |
| 120 kHz | 170 |

As depicted in the example of Table 1, a first NTN-specific RLC RTT corresponding to a subcarrier spacing of 15 kHz may have a value of 200 milliseconds, a second NTN-specific RLC RTT corresponding to a subcarrier spacing of 30 kHz may have a value of 190 milliseconds, a third NTN-specific RLC RTT corresponding to a subcarrier spacing of 60 kHz may have a value of 180 milliseconds, and a fourth NTN-specific RLC RTT corresponding to a subcarrier spacing of 120 kHz may have a value of 170 milliseconds. Accordingly, if the UE 115-a communicates with the network node 205 according to a subcarrier spacing of 30 kHz, the UE 115-a may select the second RLC RTT having a value of 190 milliseconds as the RLC RTT 235 for calculation of the size of the buffer 245. In some examples, the set of RLC RTTs at the subcarrier spacing level of granularity may be a defined set of RLC RTTs or configured by the network node 205 (e.g., via RRC signaling). It is noted that the values for the NTN-specific RLC RTTs included in Table 1 are example values provided for clarity, however, any values for the NTN-specific RLC RTTs may be supported.

TABLE 2

| Subcarrier Spacing (KHz) | RLC RTT for NTN (milliseconds) |
| --- | --- |
| 15 kHz | 200 |
| 30 kHz | |
| 60 kHz | |
| 120 kHz | |

In some examples, the UE 115-*a* may be configured with (e.g., by the network node 205) or otherwise store a value (e.g., a defined value) of the RLC RTT 235 that is NTN-specific. For example, as depicted in the example of Table 2 above, a NTN-specific RLC RTT may be configured or defined as having a value of 200 milliseconds (e.g., or some other value) regardless of the subcarrier spacing. Accordingly, the UE 115-*a* may determine the RLC RTT 235 as having a value of 200 milliseconds regardless of the subcarrier spacing. In some cases, the UE 115-*a* may be configured with or otherwise store the NTN-specific value of the RLC RTT 235 under an assumption that the propagation delay of a satellite (e.g., the NTN node 215) may be a dominant contributor in lengthening an RLC RTT. Thus, a HARQ RTT decided in relation to subcarrier spacing may be relatively marginal compared to the RLC RTT. Such an assumption may simplify a process for calculating the buffer size at the UE.

In some examples, the set of RLC RTTs may include NTN-specific RLC RTTs at a subcarrier spacing group level of granularity. Table 3 below depicts an example of a set of RLC RTTs at the subcarrier spacing group level of granularity that includes an NTN-specific RLC RTT in milliseconds for three subcarrier spacing groups, although any quantity of NTN-specific RLC RTTs corresponding to respective subcarrier spacing groups may be included in the set of RLC RTTs.

TABLE 3

| Subcarrier Spacing Group | Subcarrier Spacing (KHz) | RLC RTT for NTN (milliseconds) |
| --- | --- | --- |
| 1 | 15 kHz | 200 |
| 2 | 30 kHz | 190 |
| 3 | 60 kHz, 120 kHz | 180 |

As depicted in the example of Table 3a first NTN-specific RLC corresponding to subcarrier spacing group 1 may have a value of 200 milliseconds, a second NTN-specific RLC RTT corresponding to a subcarrier spacing group 2 may have a value of 190 milliseconds, and a third NTN-specific RLC RTT corresponding to a subcarrier spacing group 3 may have a value of 180 milliseconds. Accordingly, if the UE 115-*a* communicates with the network node 205 according to a subcarrier spacing associated with subcarrier spacing group 2 (e.g., 30 kHz), the UE 115-*a* may select the second RLC RTT having a value of 190 milliseconds as the RLC RTT 235 for calculation of the size of the buffer 245. In some cases, the UE 115-*a* may be configured with or otherwise store the set of RLC RTTs at the subcarrier spacing group level of granularity under an assumption that the propagation delay of a satellite may be the dominant contributor in lengthening the RLC RTT, and thus a HARQ RTT decided in relation to subcarrier spacing may be relatively marginal. Such an assumption may simplify a process for calculating the buffer size at the UE and provide increased resolution (e.g., granularity) and relaxation of the calculated buffer size, for example, compared with being configured with or otherwise storing an NTN-specific value of an RLC RTT described with reference to Table 2.

In some examples, the set of RLC RTTs may include NTN-specific RLC RTTs that each correspond to a respective orbit (e.g., or elevation, altitude) or orbit group of the NTN node 215. For example, the NTN node 215 may be in a GSO, a non-GSO (e.g., any orbit that is not a GSO), a GEO, a high earth orbit, an MEO, an LEO, or a highly elliptical orbit. In some cases, the NTN node 215 may be an example of a HAPS at a corresponding elevation. An example of a set of RLC RTTs at the orbit level of granularity (e.g., which may include an altitude or elevation of any type of NTN node 215, such as an elevation of a HAPS, an aircraft, etc.) that includes an NTN-specific RLC RTT in milliseconds for four orbits is depicted in Table 4 below, although any quantity of NTN-specific RLC RTTs corresponding to respective orbits may be included in the set of RLC RTTs.

TABLE 4

| Orbit | RLC RTT for NTN (milliseconds) |
| --- | --- |
| GEO | 200 |
| MEO | 150 |
| LEO | 100 |
| HAPS | 70 |

An example of a set of RLC RTTs at the orbit group level of granularity that includes an NTN-specific RLC RTT in milliseconds for three orbit groups is depicted in Table 5 below, although any quantity of NTN-specific RLC RTTs corresponding to respective orbit groups may be included in the set of RLC RTTs.

TABLE 5

| Orbit group | Orbit | RLC RTT for NTN (milliseconds) |
| --- | --- | --- |
| 1 | GEO | 200 |
| 2 | MEO, LEO | 150 |
| 3 | HAPS | 70 |

As depicted in the example of Table 4, a first NTN-specific RLC RTT corresponding to a GEO may have a value of 200 milliseconds, a second NTN-specific RLC RTT corresponding to an MEO may have a value of 150 milliseconds, a third NTN-specific RLC RTT corresponding to an LEO may have a value of 100 milliseconds, and a fourth NTN-specific RLC RTT corresponding to an elevation of a HAPS may have a value of 70 milliseconds. Accordingly, if the NTN node 215 is in a GEO, the UE 115-*a* may select the first RLC RTT having a value of 200 milliseconds as the RLC RTT 235 for calculation of the size of the buffer 245. In some examples, the set of RLC RTTs at the orbit level of granularity may be a defined set of RLC RTTs or configured by the network node 205 (e.g., via RRC signaling). It is noted that the values for the NTN-specific RLC RTTs included in Table 5 are example values provided for clarity, however, any values for the NTN-specific RLC RTTs may be supported.

As depicted in the example of Table 5, a first NTN-specific RLC RTT corresponding to an orbit group 1 (e.g., including a GEO) may have a value of 200 milliseconds, a second NTN-specific RLC RTT corresponding to an orbit group 2 (e.g. including an MEO and LEO) may have a value of 150 milliseconds, and a third NTN-specific RLC RTT corresponding to an orbit group 3 (e.g., including an elevation of a HAPS) may have a value of 70 milliseconds. Accordingly, if the NTN node 215 is in an orbit of orbit group 1 (e.g., in a GEO), the UE 115-a may select the first RLC RTT having a value of 200 milliseconds as the RLC RTT 235 for calculation of the size of the buffer 245. In some examples, the set of RLC RTTs at the orbit group level of granularity may be a defined set of RLC RTTs or configured by the network node 205 (e.g., via RRC signaling). It is noted that the values for the NTN-specific RLC RTTs included in Table 5 are example values provided for clarity, however, any values for the NTN-specific RLC RTTs may be supported.

The orbits (e.g., or orbit groups) of the NTN node 215 may be differentiated at varying levels of granularity. For example, an orbit of the NTN node 215 may be differentiated as a GSO or a non-GSO. Alternatively, the orbit of the NTN node 215 may be differentiated as an LEO, an MEO, a high earth orbit, a highly elliptical orbit, or a GEO. Alternatively, an orbit of the NTN node 215 may be characterized in terms of its elevation. For example, orbits between an elevation X and an elevation Y may be characterized as an orbit XX, orbits between an elevation Y and an elevation Z may be characterized as an orbit YY, and so on. For instance, orbital heights between 300 kilometers (km) and 36,000 km at a granularity of 2 km may be characterized as multiple different orbit types (e.g., 17,850 different orbit types). The UE 115-a may be configured or pre-configured with a set of RLC RTTs at the orbit level of granularity that includes NTN-specific RLC RTTs at any level of orbit granularity.

In some examples, the set of RLC RTTs may include NTN-specific RLC RTTs that each correspond to a respective subcarrier spacing and a respective orbit (e.g., or elevation, altitude) of the NTN node 215. An example of a set of RLC RTTs at the subcarrier spacing and orbit level of granularity that includes an NTN-specific RLC RTT in milliseconds for four subcarrier spacings and four orbits is depicted in Table 6 below, although any quantity of NTN-specific RLC RTTs corresponding to respective subcarrier spacings and orbits may be included in the set of RLC RTTs.

TABLE 6

| Subcarrier Spacing (KHz) | RLC RTT for GEO | RLC RTT for MEO | RLC RTT for LEO | RLC RTT for HAPS |
|---|---|---|---|---|
| 15 kHz | 200 | 150 | 100 | 70 |
| 30 kHz | 190 | 140 | 90 | 60 |
| 60 kHz | 180 | 130 | 80 | 50 |
| 120 kHz | 170 | 120 | 70 | 40 |

As depicted in the example of Table 6, each respective orbit of the NTN node 215 may be associated with four NTN-specific RLC RTTs that each correspond to a different subcarrier spacing of the communications 230. Accordingly, if the NTN node 215 is in a LEO and the UE 115-a and the network node 205 communicate according to a 60 kHz subcarrier spacing, the UE 115-a may select the RLC RTT having a value of 80 milliseconds as the RLC RTT 235 for calculation of the size of the buffer 245. In some examples, the set of RLC RTTs at the subcarrier spacing and orbit level of granularity may be a defined set of RLC RTTs or configured by the network node 205 (e.g., via RRC signaling). It is noted that the values for the NTN-specific RLC RTTs included in Table 6 are example values provided for clarity, however, any values for the NTN-specific RLC RTTs may be supported.

In some examples, the set of RLC RTTs may include NTN-specific RLC RTTs that each correspond to a respective subcarrier spacing group and a respective orbit group of the NTN node 215. An example of a set of RLC RTTs at the subcarrier spacing group and orbit group level of granularity that includes an NTN-specific RLC RTT in milliseconds for three subcarrier spacing groups and three orbit groups is depicted in Table 7 below, although any quantity of NTN-specific RLC RTTs corresponding to respective subcarrier spacing groups and orbit groups may be included in the set of RLC RTTs.

TABLE 7

| Subcarrier Spacing Group | Subcarrier Spacing (KHz) | RLC RTT for orbit group1 GEO | RLC RTT for orbit group2 MEO, LEO | RLC RTT for orbit group3 HAPS |
|---|---|---|---|---|
| 1 | 15 kHz | 200 | 150 | 70 |
| 2 | 30 kHz | 190 | 140 | 60 |
| 3 | 60 kHz, 120 kHz | 180 | 130 | 50 |

As depicted in the example of Table 7, each respective orbit group of the NTN node 215 may be associated with three NTN-specific RLC RTTs that each correspond to a different subcarrier spacing group. Accordingly, if the NTN node 215 is in an orbit of orbit group 2 (e.g., a LEO) and the UE 115-a and the network node 205 communicate according to a subcarrier spacing in subcarrier spacing group 3 (e.g. a 60 kHz subcarrier spacing), the UE 115-a may select the RLC RTT having a value of 130 milliseconds as the RLC RTT 235 for calculation of the size of the buffer 245. In some examples, the set of RLC RTTs at the subcarrier spacing group and orbit group level of granularity may be a defined set of RLC RTTs or configured by the network node 205 (e.g., via RRC signaling). It is noted that the values for the NTN-specific RLC RTTs included in Table 7 are example values provided for clarity, however, any values for the NTN-specific RLC RTTs may be supported.

In some examples, the UE 115-a may calculate the RLC RTT 235 using a terrestrial network-specific RLC RTT (e.g., an RLC RTT 240) and an NTN-specific offset, an NTN-specific scalar, or both. For example, the UE 115-a may be configured to select a terrestrial network-specific RLC RTT from a set of RLC RTTs that are specific to terrestrial networks based on a subcarrier spacing of the communications 230. An example of a set of terrestrial network-specific RLC RTTs including a terrestrial network-specific RLC RTT in milliseconds for four subcarrier spacings in kHz is depicted in Table 8 below, although any quantity of terrestrial network-specific RLC RTTs corresponding to respective subcarrier spacings may be included in the set of RLC RTTs.

TABLE 8

| Subcarrier Spacing (kHz) | RLC RTT for Terrestrial Network (milliseconds) |
|---|---|
| 15 kHz | 50 |
| 30 kHz | 40 |
| 60 kHz | 30 |
| 120 kHz | 20 |

As depicted in the example of Table 8, if the UE 115-a communicates with the network node 205 according to a subcarrier spacing of 120 kHz, the UE 115-a may select the terrestrial network-specific RLC RTT having a value of 20 milliseconds. To calculate the RLC RTT 235, the UE 115-*a* may be configured to add an NTN-specific offset to the terrestrial network-specific RLC RTT, multiply the terrestrial network-specific RLC RTT by an NTN-specific scalar, or both.

For example, the UE 115-*a* may select the NTN-specific offset from a set of NTN-specific offsets based on an orbit of the NTN node 215. For instance, the set of NTN-specific offsets may be at the orbit level of granularity and the UE 115-*a* may select the NTN-specific offset from the set of NTN-specific offsets that corresponds to the orbit of the NTN node 215. Tables 9 below depicts an example of a set of NTN-specific offsets in milliseconds at the orbit level of granularity. It is noted that the values for the NTN-specific offsets and the quantity of NTN-specific offsets included in Table 5 are examples provided for clarity, however, any quantity of NTN-specific offsets and corresponding values at respective levels of orbital granularity may be supported.

TABLE 9

| Orbit | Offset for NTN (milliseconds) |
|---|---|
| GEO | 150 |
| MEO | 100 |
| LEO | 50 |
| HAPS | 20 |

As depicted in the example of Table 9, each respective orbit may correspond to a respective NTN-specific offset. Accordingly, the UE 115-*a* may select an NTN-specific offset based on the orbit of the NTN node 215 and add the NTN-specific offset to the terrestrial network-specific RLC RTT to calculate the RLC RTT 235. For example, if the UE 115-*a* selects the terrestrial network-specific RLC RTT having a value of 20 milliseconds based on communicating with the network node 205 according to a 120 kHz subcarrier spacing and selects the NTN-specific offset having a value of 100 milliseconds based on the orbit of the NTN node 215 being an MEO, the UE 115-*a* may add the selected terrestrial network-specific RLC RTT and the selected NTN-specific offset together to calculate an RLC RTT 235 having a value of 120 milliseconds.

In some examples, the set of NTN-specific offsets may be at the orbit group level of granularity. Tables 10 below depicts an example of a set of NTN-specific offsets in milliseconds at the orbit group level of granularity. It is noted that the values for the NTN-specific offsets and the quantity of NTN-specific offsets included in Table 10 are examples provided for clarity, however, any quantity of NTN-specific offsets and corresponding values at respective levels of orbital group granularity may be supported.

TABLE 10

| Orbit group | Orbit | Offset for NTN (milliseconds) |
|---|---|---|
| 1 | GEO | 150 |
| 2 | MEO, LEO | 100 |
| 3 | HAPS | 20 |

As depicted in the example of Table 10, each respective orbit group may correspond to a respective NTN-specific offset. Accordingly, the UE 115-*a* may select an NTN-specific offset based on the orbit group of the NTN node 215 and add the NTN-specific offset to the terrestrial network-specific RLC RTT to calculate the RLC RTT 235. For example, if the UE 115-*a* selects the terrestrial network-specific RLC RTT having a value of 20 milliseconds based on communicating with the network node 205 according to a 120 kHz subcarrier spacing and selects the NTN-specific offset having a value of 100 milliseconds based on the orbit of the NTN node 215 being in orbit group 2, the UE 115-*a* may add the selected terrestrial network-specific RLC RTT and the selected NTN-specific offset together to calculate an RLC RTT 235 having a value of 120 milliseconds.

In some examples, the UE 115-*a* may select the NTN-specific scalar from a set of NTN-specific scalars based on the orbit of the NTN node 215. For instance, the set of NTN-specific scalars may be at the orbit level of granularity and the UE 115-*a* may select the NTN-specific scalar from the set of NTN-specific scalars that corresponds to the orbit of the NTN node 215. Tables 11 below depicts an example of a set of NTN-specific scalars at the orbit level of granularity. It is noted that the values for the NTN-specific scalars and the quantity of NTN-specific scalars included in Table 11 are examples provided for clarity, however, any quantity of NTN-specific scalars and corresponding values at respective levels of orbital granularity may be supported.

TABLE 11

| Orbit | Scalar for NTN |
|---|---|
| GEO | 3 |
| MEO | 2 |
| LEO | 1.5 |
| HAPS | 1.2 |

As depicted in the example of Table 11, each respective orbit may correspond to a respective NTN-specific scalar. Accordingly, the UE 115-*a* may select an NTN-specific scalar based on the orbit of the NTN node 215 and multiply the terrestrial network-specific RLC RTT by the NTN-specific scalar to calculate the RLC RTT 235. For example, if the UE 115-*a* selects the terrestrial network-specific RLC RTT having a value of 30 milliseconds based on communicating with the network node 205 according to a 60 kHz subcarrier spacing and selects the NTN-specific scalar having a value of 1.2 based on an elevation of the NTN node 215 being that of a HAPS, the UE 115-*a* may multiply the selected terrestrial network-specific RLC RTT by the selected NTN-specific scalar to calculate an RLC RTT 235 having a value of 36 milliseconds.

In some examples, the set of NTN-specific scalars may be at the orbit group level of granularity. Tables 12 below depicts an example of a set of NTN-specific scalars at the orbit group level of granularity. It is noted that the values for the NTN-specific scalars and the quantity of NTN-specific scalars included in Table 12 are examples provided for clarity, however, any quantity of NTN-specific scalars and corresponding values at respective levels of orbital group granularity may be supported.

TABLE 12

| Orbit group | Orbit | Scalar for NTN |
|---|---|---|
| 1 | GEO | 3 |
| 2 | MEO, LEO | 2 |
| 3 | HAPS | 1.2 |

As depicted in the example of Table 12, each respective orbit group may correspond to a respective NTN-specific scalar. Accordingly, the UE 115-*a* may select an NTN-specific scalar based on the orbit group of the NTN node 215 and multiply the terrestrial network-specific RLC RTT by the NTN-specific scalar to calculate the RLC RTT 235. For example, if the UE 115-a selects the terrestrial network-specific RLC RTT having a value of 30 milliseconds based on communicating with the network node 205 according to a 60 kHz subcarrier spacing and selects the NTN-specific scalar having a value of 1.2 based on the orbit of the NTN node 215 being in orbit group 3 (e.g., an elevation of the NTN node 215 being that of a HAPS), the UE 115-a may multiply the selected terrestrial network-specific RLC RTT by the selected NTN-specific scalar to calculate an RLC RTT 235 having a value of 36 milliseconds.

In some examples, the UE 115-a may select both an NTN-specific offset and an NTN-specific scalar for calculation of the RLC RTT based on the orbit of the NTN node 215. For example, Tables 13 below depicts an example of a set of NTN-specific offsets and a set of NTN-specific scalars at the orbit level of granularity. The UE 115-a may be configured to select both an NTN-specific offset and an NTN-specific scalar corresponding to the orbit of the NTN node 215 to use in calculating the RLC RTT. It is noted that the quantity and values for the NTN-specific offsets and the NTN-specific scalars included in Table 13 are examples provided for clarity, however, any quantity of NTN-specific offsets and NTN-specific scalars and corresponding values at respective levels of orbital granularity may be supported.

TABLE 13

| Orbit | Offset for NTN | Scalar for NTN |
|---|---|---|
| GEO | 120 | 2 |
| MEO | 80 | 1.5 |
| LEO | 40 | 1 |
| HAPS | 10 | 1 |

As depicted in the example of Table 13, each respective orbit may correspond to a respective NTN-specific offset and to a respective NTN-specific scalar. Accordingly, the UE 115-a may select an NTN-specific offset and an NTN-specific scalar based on the orbit of the NTN node 215 and calculate the RLC RTT 235 using the terrestrial network-specific RLC RTT, the NTN-specific offset, and the NTN-specific scalar. For example, if the UE 115-a communicates with the network node 205 according to a 15 kHz subcarrier spacing and the orbit of the NTN node 215 is a GEO, the UE 115-a may select the terrestrial network-specific RLC RTT having a value of 50 milliseconds, the NTN-specific offset having a value of 120 milliseconds, and the NTN-specific scalar having a value of 2. The UE 115-a may multiply the terrestrial network-specific RLC RTT by the NTN-specific scalar and add the NTN-specific offset to the resulting product to calculate a value of the RLC RTT 235 as 220 milliseconds.

In some examples, the set of NTN-specific offsets and the set of NTN-specific scalars may be at the orbit group level of granularity. Tables 14 below depicts an example of a set of NTN-specific offsets and a set of NTN-specific scalars at the orbit group level of granularity. It is noted that the quantity and values for the NTN-specific offsets and the NTN-specific scalars included in Table 14 are examples provided for clarity, however, any quantity of NTN-specific offsets and NTN-specific scalars and corresponding values at respective levels of orbital group granularity may be supported.

TABLE 14

| Orbit group | Orbit | Offset for NTN (milliseconds) | Scalar for NTN |
|---|---|---|---|
| 1 | GEO | 150 | 3 |
| 2 | MEO, LEO | 100 | 2 |
| 3 | HAPS | 20 | 1.2 |

As depicted in the example of Table 14, each respective orbit group may correspond to a respective NTN-specific offset and to a respective NTN-specific scalar. Accordingly, the UE 115-a may select an NTN-specific offset and an NTN-specific scalar based on the orbit of the NTN node 215 and calculate the RLC RTT 235 using the terrestrial network-specific RLC RTT, the NTN-specific offset, and the NTN-specific scalar. For example, if the UE 115-a communicates with the network node 205 according to a 15 kHz subcarrier spacing and the orbit of the NTN node 215 is included in orbit group 1 (e.g., a GEO), the UE 115-a may select the terrestrial network-specific RLC RTT having a value of 50 milliseconds, the NTN-specific offset having a value of 150 milliseconds, and the NTN-specific scalar having a value of 2. The UE 115-a may multiply the terrestrial network-specific RLC RTT by the NTN-specific scalar and add the NTN-specific offset to the resulting product to calculate a value of the RLC RTT 235 as 300 milliseconds. In some examples, different granularities may be considered for the NTN-specific offset and the NTN-specific scalar. For example, the set of NTN-specific offsets may be at the orbit level of granularity (e.g., for finer resolution), and the set of NTN-specific scalars may be at the orbit group level of granularity, or vice versa.

In some examples, the UE 115-a may further determine the RLC RTT 235 based on a carrier aggregation configuration of the communications 230 between the UE 115-a and the network node 205. Additional details regarding determining the RLC RTT 235 based on the carrier aggregation configuration are described with reference to FIG. 3 below. Additionally or alternatively, the UE 115-a may further calculate the size of the buffer 245 based on a delay associated with communications between base stations 105 (not shown) in the NTN. Additional details regarding calculating the size of the buffer 245 based on the delay are described with reference to FIG. 3 below.

In some examples, the establishment of the connection with the NTN node 215, the calculation of the size of the buffer 245, or both, may be based on a capability of the UE 115-a. For example, during the establishment of the connection with the NTN node 215, the UE 115-a may transmit a capability message 225 that indicates one or more orbits or elevations of the NTN node 215 that are supported by the UE 115-a with respect to communicating with the NTN node 215. Accordingly, if the orbit or elevation of the NTN node 215 is supported by the UE 115-a, the UE 115-a and the network node 205 may proceed with the establishment of the connection via the NTN node 215.

The capability message 225 may additionally or alternatively indicate one or more orbits (e.g., orbit groups) or elevations of the NTN node 215 that are supported by the UE 115-a with respect to a size of the buffer 245. For example, the UE 115-a may indicate that it supports a size of the buffer 245 that corresponds to the one or more orbits or elevations of the NTN node 215, while sizes of the buffer 245 corresponding to other orbits or elevations of the NTN node 215 may be unsupported. The one or more supported orbits or elevations of the NTN node 215 with respect to the size of the buffer 245 may be the same as or different from the one or more supported orbits or elevations of the NTN node 215 with respect to communicating with the NTN node 215. If there is a difference between the supported orbits or elevations, the UE 115-*a* may establish the connection with the network node 205 via an NTN node 215 in a supported orbit or elevation but calculate a size of the buffer 245 that is supported by the UE 115-*a*. For example, the UE 115-*a* may indicate support for communicating with an NTN node 215 in a GEO and support for a size of the buffer 245 corresponding to an MEO via the capability message 225, which may implicitly indicate that communicating with an NTN node 215 in an MEO and a size of the buffer 245 corresponding to a GEO are unsupported by the UE 115-*a* (although, in some examples, the UE 115-*a* may explicitly indicate which orbits are supported and which are unsupported). Here, the UE 115-*a* establish a connection with an NTN node 215 in a GEO but may calculate the size of the buffer 245 in accordance with its supported capability. For example, the UE 115-*a* may determine (e.g., select, calculate) an RLC RTT 235 corresponding to an MEO, which may result in the size of the buffer 245 being smaller than if it were calculated using an RLC RTT corresponding to the GEO of the NTN node 215 but larger than if it were calculated using an RLC RTT 240. Here, the network node 205 may determine (e.g., be aware of) the buffer size discrepancy and may schedule the communications 230 such that memory overflow is avoided.

In some examples, the capability message 225 may additionally or alternatively indicate one or more latencies of the communications 230 with the network node 205 that are supported by the UE 115-*a* with respect to communicating with the network node 205. For example, the orbit of the NTN node 215 may be unknown to the UE 115-*a*, however, the latency of the communications 230 with the network node 205 via the NTN node 215 may be determined by the UE 115-*a*. The latency of the communications 230 may correspond to an orbit of the NTN node 215. For example, the higher the orbit or elevation of the NTN node 215, the longer the latency of the communications 230. If a latency of the communications 230 is supported by the UE 115-*a*, the UE 115-*a* and the network node 205 may proceed with the establishment of the connection via the NTN node 215.

In some examples, the capability message 225 may indicate one or more latency ranges supported by the UE 115-*a* with respect to communicating with the network node 205. For example, a first latency range may correspond to an RLC RTT 235<20 milliseconds, a second latency range may correspond to a 20 milliseconds≤RLC RTT 235<30 milliseconds, a third latency range may correspond to a 30 milliseconds≤RLC RTT 235<50 milliseconds, and a third latency range may correspond to an RLC RTT 235≥50 milliseconds. The capability message 225 may indicate that the UE 115-*a* supports an RLC RTT 235 of the communications 230 within one or more of the first latency range, the second latency range, the third latency range, or the fourth latency range.

The capability message 225 may additionally or alternatively indicate one or more latencies (e.g., latency ranges) of the communications 230 with the network node 205 that are supported by the UE 115-*a* with respect to a size of the buffer 245. The one or more supported latencies with respect to the size of the buffer 245 may be the same as or different from the one or more supported latencies with respect to communicating with the network node 205. If there is a difference between the supported latencies, the UE 115-*a* may establish the connection with the network node 205 via an NTN node such that a supported latency of the communications 230 is achieved but calculate a size of the buffer 245 that is supported by the UE 115-*a*.

Figure 3:
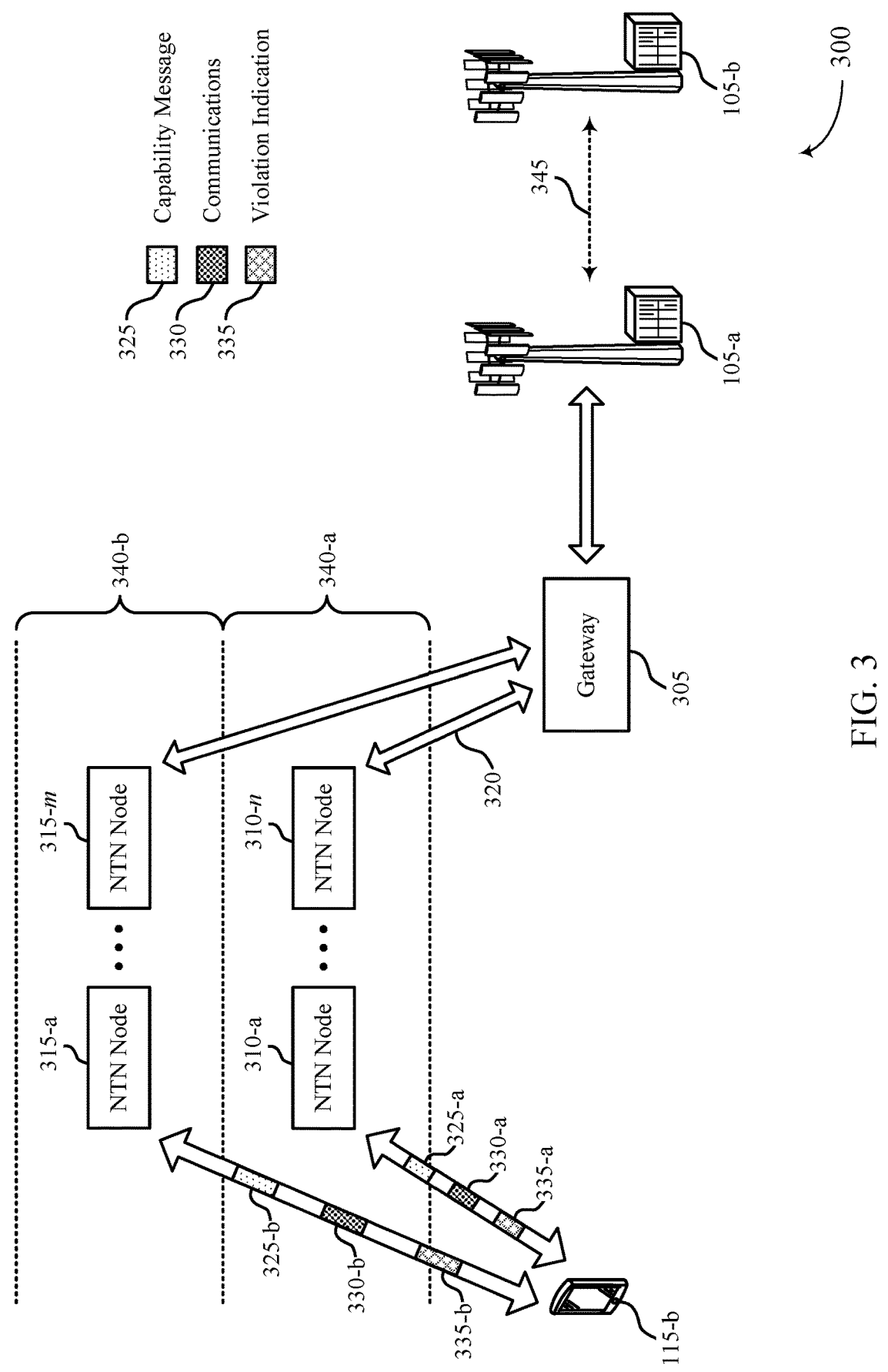

FIG. 3 illustrates an example of a wireless communications system 300 that supports buffering techniques for NTNs in accordance with aspects of the present disclosure. The wireless communications system 300 may implement or be implemented by aspects of the wireless communications systems 100 and 200 described with reference to FIGS. 1 and 2, respectively. For example, the wireless communications system 300 may include a base station 105-*b*, a base station 105-*b*, a UE 115-*b*, a gateway 305, NTN nodes 310, and NTN nodes 315, which may be examples of the corresponding devices described with reference to FIGS. 1 and 2. The wireless communications system 300 may support NTN communication buffering to support improvements to data buffering and processing, memory overflow prevention, latency, communication scheduling, and coordination between devices, among other benefits.

The wireless communications system 300 may support communications between the wireless devices of the wireless communications system 300 via respective communication links 320, which may be examples of a communication link 125 or a communication link 220 as described with reference to FIGS. 1 and 2. For example, the wireless communications system 300 may support communications, via respective communication links 320, between the base station 105-*a* and the gateway 305, between the gateway 305 and the NTN nodes 310, between the gateway 305 and the NTN nodes 315, between the UE 115-*b* and the NTN nodes 310, and between the UE 115-*b* and the NTN nodes 315. In some examples, a communication link 320 between the base station 105-*a* and the gateway 305 may be an example of a backhaul link 120 described with reference to FIG. 1. In some examples, the base station 105-*a* may be an example of the network node 205 described with reference to FIG. 2. In some cases, the base station 105-*a* may operate as a gateway 305 and may communicate directly with the NTN nodes 310, the NTN nodes 315, or both. The wireless communications system 300 may also support communications between the base station 105-*a* and the base station 105-*b* via a communication link 345, which may be an example of a backhaul link 120.

The wireless communications system 200 may enable the UE 115-*b* to access a network (e.g., a core network 130) via an NTN. For example, the UE 115-*b* may be able to communicate with the base station 105-*a* via one or more NTN nodes 310, one or more NTN nodes 315, or both. Accordingly, to access a network (e.g., a core network 130), the UE 115-*b* may establish a connection with the base station 105-*a* via one or more NTN nodes 310, one or more NTN nodes 315, or both.

In some examples, the UE 115-*b* and the base station 105-*a* may communicate via the NTN according to a carrier aggregation for a set of serving cells associated with a set of NTN nodes. For example, each of the NTN nodes 310 and the NTN nodes 315 may be associated with a respective serving cell. Communications 330 between the UE 115-*b* and the base station 105-*a* may be communicated according to a carrier aggregation involving one or more NTN nodes 310, one or more NTN nodes 315, or a combination thereof.

The UE 115-*b* may be configured to buffer the communications 330 with the base station 105-*a* using a buffer (e.g., a buffer 245), which may be an example of a layer 2 buffer described herein. The communications 330 may correspond to control signaling, information, data, packets, radio bearers, and the like, that are exchanged between the UE 115-*b* and the base station 105-*a* via the NTN nodes. The UE 115-*b* may buffer (e.g., temporarily store) the communications 330 using the buffer, for example, to support segmentation, reassembly, reordering, and feedback communication for the communications 330.

The UE 115-*b* may calculate a size of the buffer that is specific to the NTN via which the UE 115-*b* and the base station 105-*a* communicate. For example, the UE 115-*b* may calculate the size of the buffer using a maximum data rate of the connection with the network node base station 105-*a* via the NTN and an RLC RTT that is specific to the NTN (e.g., and determined as described with reference to FIG. 2). In some examples, the NTN-specific RLC RTT used to calculate the size of the buffer may be based on the carrier aggregation according to which the UE 115-*b* and the base station 105-*a* communicate. For example, the UE 115-*b* may determine an NTN-specific RLC RTT corresponding to each NTN node associated with the carrier aggregation. The UE 115-*b* may select the largest NTN-specific RLC RTT of the determined NTN-specific RLC RTTs for the calculation of the size of the buffer.

In some examples, the UE 115-*b* indicate a restriction of the carrier aggregation to NTN nodes associated with similar communication latencies in order to avoid large discrepancies between the determined NTN-specific RLC RTTs corresponding to the NTN nodes of the carrier aggregation. For example, the NTN nodes 310 (e.g., an NTN node 310-*a* through an NTN node 310-*n*) may be associated with an orbit 340-*a*, and the NTN nodes 315 (e.g., an NTN node 315-*a* through an NTN node 315-*m*) may be associated with an orbit 340-*b*, where the orbit 340-*a* may be a lower orbit than the orbit 340-*b* (e.g., the NTN nodes 310 may orbit closer to the earth than the NTN nodes 315). In some cases, a first range of latencies associated with communications 330-*a* between the UE 115-*b* and the base station 105-*a* via the NTN nodes 310 may be smaller than a second range of latencies associated with communications 330-*b* between the UE 115-*b* and the base station 105-*a* via the NTN nodes 315, for example, due to the orbit 340-*a* being lower than the orbit 340-*b*. Accordingly, a first range of RLC RTTs associated with the communications 330-*a* may be less than a second range of RLC RTTs associated with the communications 330-*b*. In some examples, if a carrier aggregation includes serving cells associated with both NTN nodes 310 and NTN nodes 315 (e.g., higher performance serving cells associated with the NTN nodes 310 and lower performance serving cells associated with the NTN nodes 315), the UE 115-*b* may determine and select an RLC RTT for the calculation of the buffer size that is unnecessarily large to support the buffering the communications 330-*a*. Additionally, the UE 115-*b* may receive a large amount of data from the higher performance cells while waiting to receive lost or delayed packets from the lower performance cells due to increased latency of the communications 330-*b*, which may result in a large amount of out-of-order data and increased complexity of packet reassembly and reordering. Accordingly, the UE 115-*b* may indicate a restriction of the carrier aggregation to serving cells, for example, associated with either the first range of latencies (e.g., the first range of RLC RTTs) or the second range of latencies (e.g., the second range of RLC RTTs).

The UE 115-*b* may indicate the restriction by transmitting a capability message 325 to the base station 105-*a*, for example, during the establishment of the connection with the base station 105-*a*. For example, the UE 115-*b* may transmit a capability message 325-*a* via an NTN node 310, a capability message 325-*b* via an NTN node 315, or both.

In response to receiving the capability message 325, the base station 105-*a* may configure the carrier aggregation for the set of serving cells in accordance with the indicated restriction. For example, the base station 105-*a* may configure the carrier aggregation to include serving cells associated with two or more NTN nodes 310 based on the serving cells being associated with the first range of latencies (e.g., first range of RLC RTTs). Alternatively, the base station 105-*a* may configure the carrier aggregation to include serving cells associated with two or more NTN nodes 315 based on the serving cells being associated with the second range of latencies (e.g., the second range of RLC RTTs). In this way, the multiplexing of higher performance data (e.g., communicated via a higher performance serving cell) and larger delay data (e.g., communicated via a lower performance serving cell) may be avoided. In some examples, the UE 115-*b* may indicate the restriction in the form of a band combination list.

In some examples, the base station 105-*a* may schedule the transmission of data to the UE 115-*b* that ignores the restriction indicated by the capability message 325. For example, the base station 105-*a* may schedule communications 330 according to a carrier aggregation that includes at least one serving cell associated with an NTN node 315 and at least one serving cell associated with an NTN node 310. Here, the UE 115-*b* may be configured to discard the received data based on the violation of the indicated restriction and may report the violation to the base station 105-*a*. For example, the UE 115-*b* may transmit a violation indication 335 (e.g., a violation indication 335-*a* via an NTN node 310, a violation indication 335-*b* via an NTN node 315) that indicates the violation to the base station 105-*a*. In some examples, the violation indication 335 may indicate the violation via an RLC NACK included in the violation indication 335. In some examples, the violation indication 335 may indicate the violation via a radio link failure message that declares radio link failure between the UE 115-*b* and the base station 105-*a*.

The UE 115-*b* may also calculate the size of the buffer based on an NTN-specific delay between base stations. For example, there may be constraints or limitations of a geographic placement of base stations 105 within the NTN. For instance, a geographic location of the base station 105-*a* may be within some distance of the gateway 305. This may result in an increased distance between the geographic location of the base station 105-*a* and a geographic location of the base station 105-*b* (e.g., or network servers). As a result, a delay of communications between the base station 105-*a* and the base station 105-*b* (e.g., and the network) may be relatively higher in the NTN than a delay of communications between base stations 105 in a terrestrial network. Accordingly, the UE 115-*b* may be configured or pre-configured with value for a delay between base stations 105 (e.g., an Xn delay, n X2/Xn delay+Queuing value) that is specific to NTNs and may use the NTN-specific delay in calculating the size of the buffer.

Figure 4:
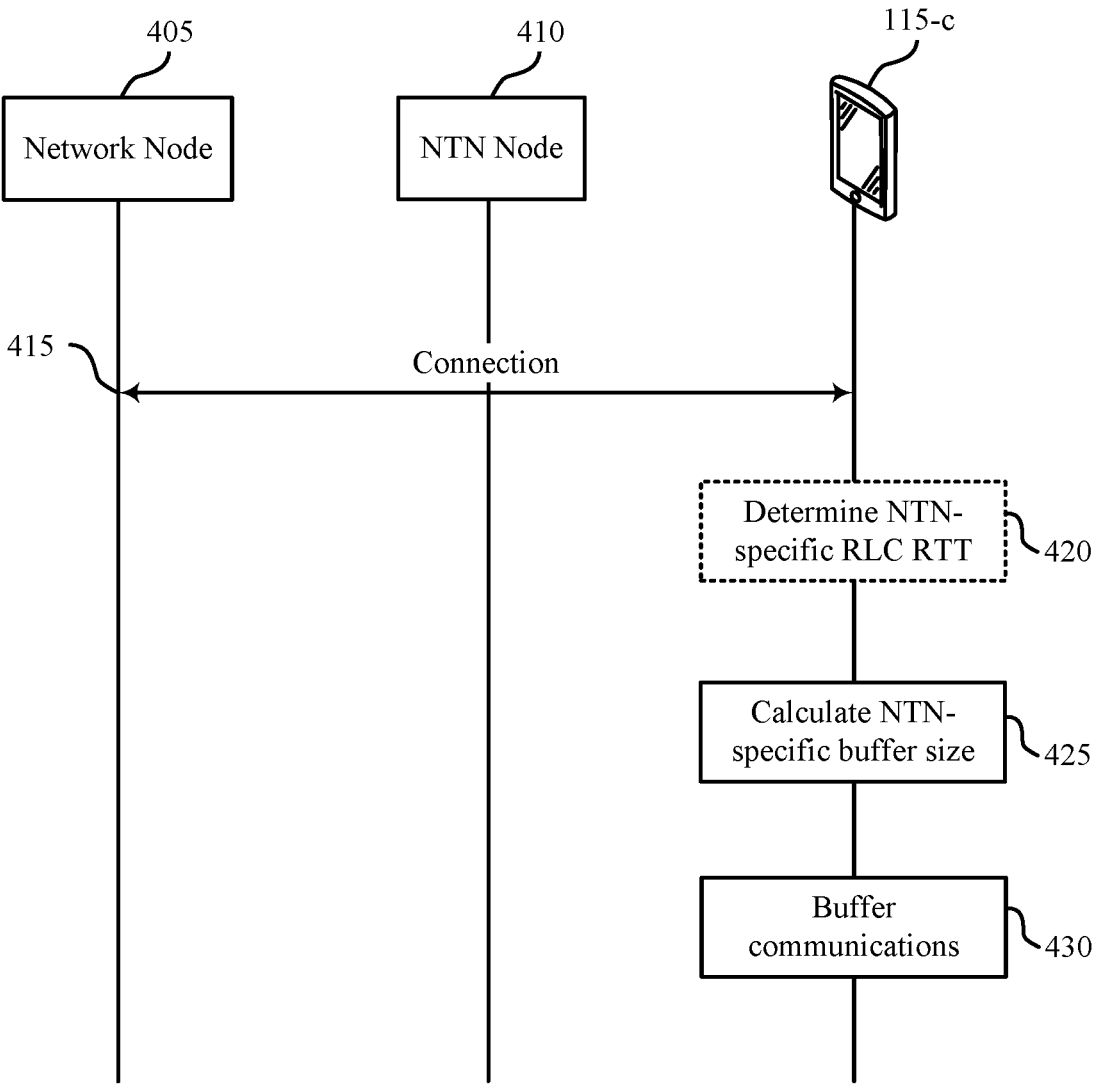
FIG. 4 illustrates an example of a process flow that supports buffering techniques for NTNs in accordance with aspects of the present disclosure.

FIG. 4 illustrates an example of a process flow 400 that supports buffering techniques for NTNs in accordance with aspects of the present disclosure. The process flow 400 may implement or may be implemented by aspects of the wireless communications systems 100, 200, and 300 as described with reference to FIGS. 1 through 3, respectively. For example, the process flow 400 may be implemented by a network node 405, an NTN node 410, and a UE 115-*c* to support the NTN communication buffering.

The network node 405, the NTN node 410, and the UE 115-*c* may each be examples of the corresponding devices as respectively described herein, including with reference to FIGS. 1 through 3. In the following description of the process flow 400, the operations may be performed in different orders or at different times. Some operations also may be omitted from the process flow 400, and other operations may be added to the process flow 400. Further, although some operations or signaling may be shown to occur at different times for discussion purposes, these operations may actually occur at the same time.

At 415, the UE 115-*c* may establish a connection with the network node 405 via an NTN. For example, the UE 115-*c* may establish the connection with the network node 405 via the NTN node 410. In other words, communications between the network node 405 and the UE 115-*c* may be routed through at least the NTN node 410 (e.g., forwarded by the NTN node 410, relayed by the NTN node 410). In some examples, the UE 115-*c* may establish the connection with the network node 405 based on a capability of the UE 115-*c*. For example, during establishment of the connection, the UE 115-*c* may transmit a capability message indicating an orbit of the NTN node 410 that is supported by the UE, a latency of communications with the network node 405 that is supported by the UE, or a combination thereof. If the UE 115-*c* determines that the orbit of the NTN node 410, a latency of communications with the network node 405, or both, are supported by the UE 115-*c*, the UE 115-*c* may establish the connection with the network node 405 via the NTN node 410.

At 420, the UE 115-*c* may determine an NTN-specific RLC RTT for use in calculating an NTN-specific buffer size of a buffer for NTN communications with the network node 405. The NTN-specific RLC RTT may have a value such that proper buffering of the NTN communications without memory overflow may be supported by the UE 115-*c*. In some examples, the UE 115-*c* may select the NTN-specific RLC RTT from a set of NTN-specific RLC RTTs, for example, based on a subcarrier spacing of the NTN communications with the network node 405, the orbit of the NTN node 410, or both (e.g., as depicted in Tables 1, 2, and 3 of FIG. 2). In some examples, the UE 115-*c* may select an RLC RTT specific to terrestrial networks from a set of RLC RTTs that are specific to terrestrial networks in accordance with the subcarrier spacing of the NTN communications (e.g., as depicted in Table 4 of FIG. 2) and may calculate the NTN-specific RLC RTT using the RLC RTT specific to terrestrial networks and one or more other factors specific to NTNs. For example, the UE 115-*c* may select an offset from a set of offsets specific to NTNs based on the orbit of the NTN node 410 (e.g., as depicted in Table 5 of FIG. 2), select a scalar from a set of scalars specific to NTNs based on the orbit of the NTN node 410 (e.g., as depicted in Table 6 of FIG. 2), or both (e.g., as depicted in Table 7 of FIG. 2). The UE 115-*c* may calculate the NTN-specific RLC RTT using the RLC RTT specific to terrestrial networks and the selected offset, the selected scalar, or both.

At 425, the UE 115-*c* may calculate the NTN-specific buffer size of the buffer for the NTN communications with the network node 405. The UE 115-*c* may calculate the NTN-specific buffer size using a maximum data rate of the connection with the network node 405 (e.g., a maximum uplink data rate, a maximum downlink data rate, or both) and the NTN-specific RLC RTT. In some examples, the UE 115-*c* may further calculate the buffer size based on a delay associated with communications between base stations 105 (not shown) in the NTN including the network node 405 and the UE 115-*c*. For example, communications between the network node 405 and the UE 115-*c* may be routed through the base stations 105 and communications between the base stations 105 may be associated with a delay, such as an Xn delay. Such delay may be larger in the NTN compared to the delay in a terrestrial network. Accordingly, the NTN-specific buffer size calculated using an NTN-specific delay may be larger compared to a buffer size calculated using a terrestrial network-specific delay.

At 430, the UE 115-*c* may buffer the NTN communications with the network node 405 using the buffer having the NTN-specific buffer size. Due to calculating the buffer size using NTN-specific values, the buffer may have sufficient memory such that the UE 115-*c* is able to buffer the NTN communications with the network node 405 without memory overflow. Additionally, in some examples, scheduling of the NTN communications may be based on the NTN-specific buffer size. For example, the network node 405 may determine (e.g., calculate) the NTN-specific buffer size using the NTN-specific values and may schedule the NTN communications such that memory overflow does not occur. Because the NTN-specific buffer size may be relatively larger than a buffer size calculated using terrestrial network-specific values, the network node 405 may be able to schedule the NTN communications more aggressively (e.g., schedule additional NTN communications within a given time period) without causing overflow, thereby reducing latency associated with the NTN communications.

In some examples, however, the UE 115-*c* may be configured to calculate the buffer size of the buffer using terrestrial network-specific communication parameters (e.g., a terrestrial network-specific RLC RTT, a terrestrial network-specific delay between base stations 105, and the like) despite communicating with the network node 405 via the NTN. Here, the network node 405 may be aware of the smaller calculated buffer size and may schedule the NTN communications (e.g., less aggressively) such that memory overflow does not occur.

Figure 5:
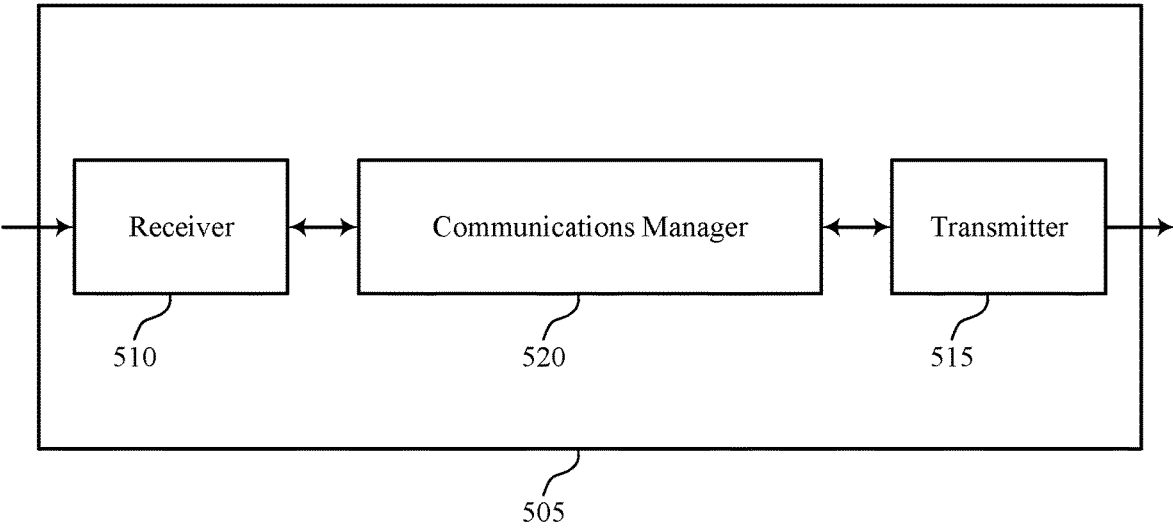
FIGS. 5 and 6 show block diagrams of devices that support buffering techniques for NTNs in accordance with aspects of the present disclosure.

FIG. 5 shows a block diagram 500 of a device 505 that supports buffering techniques for NTNs in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to buffering techniques for NTNs). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to buffering techniques for NTNs). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of buffering techniques for NTNs as described herein. For example, the communications man-ager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-pro-grammable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the com-munications manager 520, the receiver 510, the transmitter 515, or various combinations or components thereof may be implemented in code (e.g., as communications management software or firmware) executed by a processor. If imple-mented in code executed by a processor, the functions of the communications manager 520, the receiver 510, the trans-mitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclo-sure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive infor-mation, transmit information, or perform various other operations as described herein.

The communications manager 520 may support wireless communication at a UE in accordance with examples as disclosed herein. For example, the communications manager 520 may be configured as or otherwise support a means for establishing a connection with a network node via an NTN. The communications manager 520 may be configured as or otherwise support a means for calculating a buffer size for communications with the network node via the connection based on a maximum data rate of the connection and an RLC layer RTT, where the buffer size is specific to NTNs. The communications manager 520 may be configured as or otherwise support a means for buffing communications between the UE and the network node over the connection using a buffer in accordance with the calculated buffer size.

By including or configuring the communications manager 520 in accordance with examples as described herein, the device 505 (e.g., a processor controlling or otherwise coupled to the receiver 510, the transmitter 515, the com-munications manager 520, or a combination thereof) may support techniques for improved data processing and buff-ering and memory overflow prevention by supporting the buffering of NTN communications.

Figure 6:
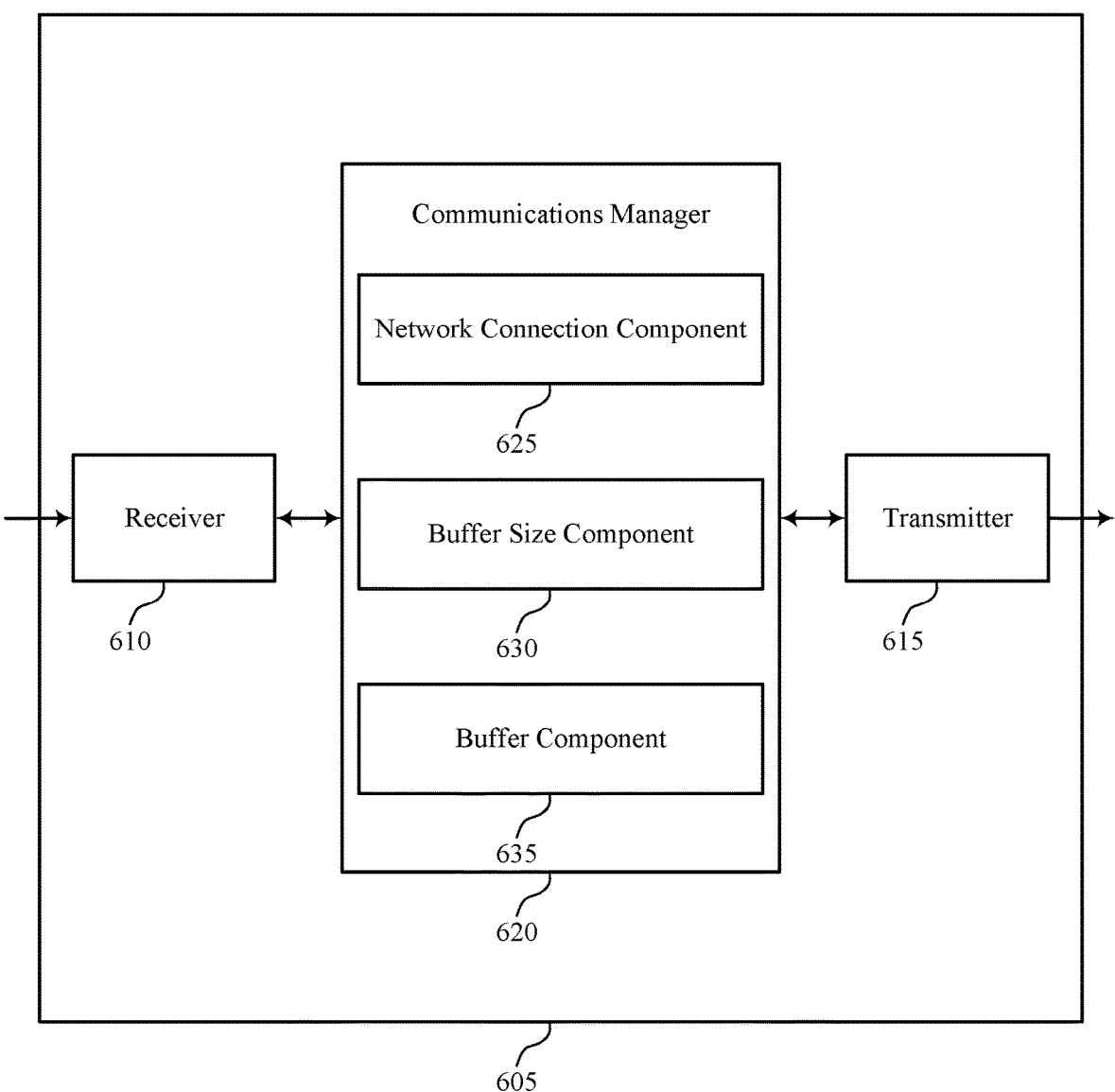

FIG. 6 shows a block diagram 600 of a device 605 that supports buffering techniques for NTNs in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various infor-mation channels (e.g., control channels, data channels, infor-mation channels related to buffering techniques for NTNs). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to buffering techniques for NTNs). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of buffering techniques for NTNs as described herein. For example, the communications manager 620 may include a network connection component 625, a buffer size compo-nent 630, a buffer component 635, or any combination thereof. The communications manager 620 may be an example of aspects of a communications manager 520 as described herein. In some examples, the communications manager 620, or various components thereof, may be con-figured to perform various operations (e.g., receiving, moni-toring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The network connection component 625 may be configured as or otherwise support a means for establishing a connection with a network node via an NTN. The buffer size component 630 may be configured as or otherwise support a means for calculating a buffer size for communications with the network node via the connection based on a maximum data rate of the connection and an RLC layer RTT, where the buffer size is specific to NTNs. The buffer component 635 may be configured as or otherwise support a means for buffering communications between the UE and the network node over the connection using a buffer in accordance with the calculated buffer size.

Figure 7:
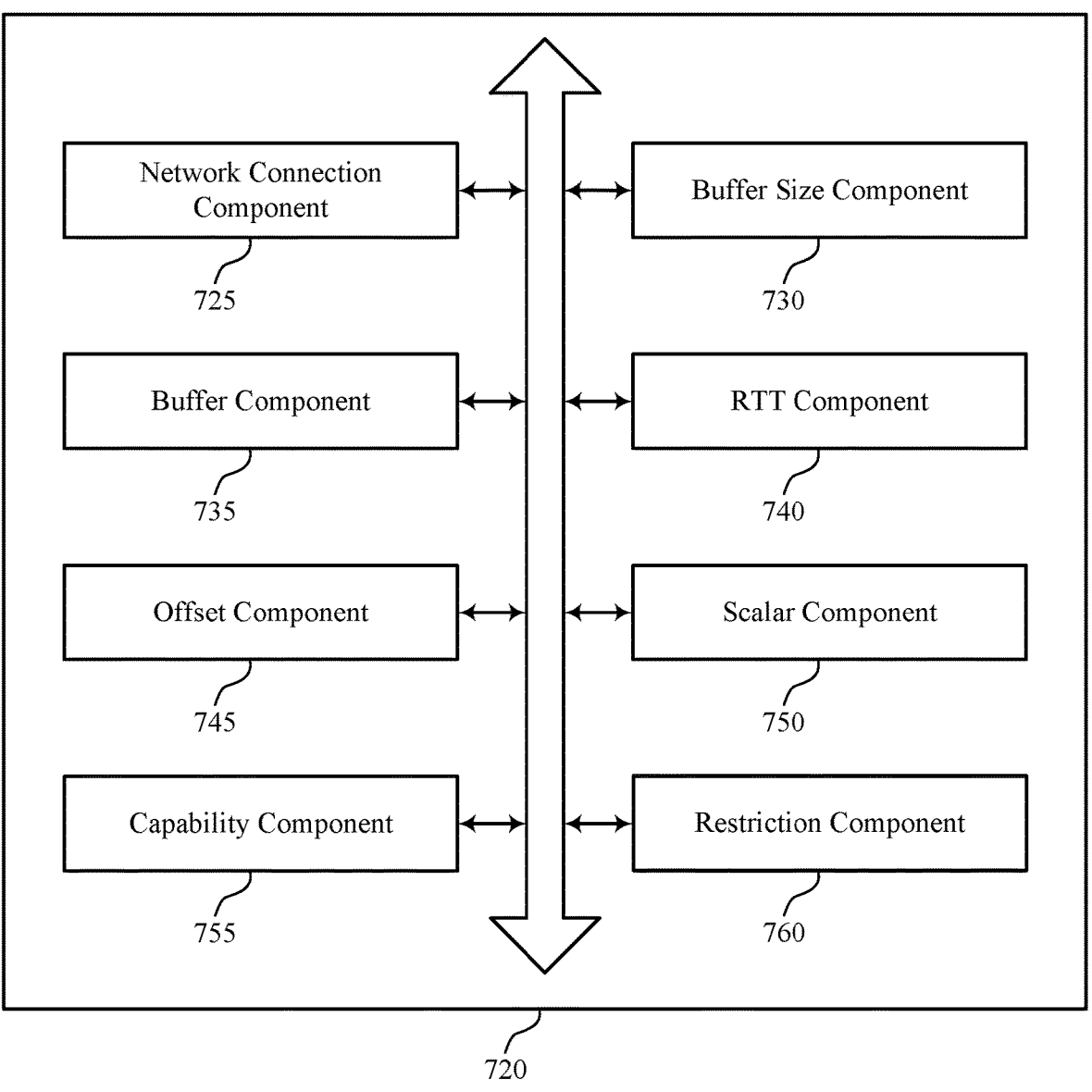
FIG. 7 shows a block diagram of a communications manager that supports buffering techniques for non NTNs in accordance with aspects of the present disclosure.

FIG. 7 shows a block diagram 700 of a communications manager 720 that supports buffering techniques for NTNs in accordance with aspects of the present disclosure. The communications manager 720 may be an example of aspects of a communications manager 520, a communications man-ager 620, or both, as described herein. The communications manager 720, or various components thereof, may be an example of means for performing various aspects of buffering techniques for NTNs as described herein. For example, the communications manager 720 may include a network connection component 725, a buffer size component 730, a buffer component 735, an RTT component 740, an offset component 745, a scalar component 750, a capability component 755, a restriction component 760, or any combination thereof. Each of these components may communicate, directly or indirectly, with one another (e.g., via one or more buses).

The communications manager 720 may support wireless communication at a UE in accordance with examples as disclosed herein. The network connection component 725 may be configured as or otherwise support a means for establishing a connection with a network node via an NTN. The buffer size component 730 may be configured as or otherwise support a means for calculating a buffer size for communications with the network node via the connection based on a maximum data rate of the connection and an RLC layer RTT, where the buffer size is specific to NTNs. The buffer component 735 may be configured as or otherwise support a means for buffering communications between the UE and the network node over the connection using a buffer in accordance with the calculated buffer size.

In some examples, the RTT component 740 may be configured as or otherwise support a means for selecting the RLC layer RTT from a set of RLC layer RTTs specific to the NTNs based on a subcarrier spacing of the communications with the network node or a subcarrier spacing group associated with the communications with the network node, where the buffer size is calculated based on selecting the RLC layer RTT.

In some examples, the RTT component 740 may be configured as or otherwise support a means for selecting the RLC layer RTT from a set of RLC layer RTTs specific to the NTNs based on an orbit of the network node or an orbit group associated with the network node, where the buffer size is calculated based on selecting the RLC layer RTT.

In some examples, the RTT component 740 may be configured as or otherwise support a means for selecting a second RLC layer RTT from a set of RLC layer RTTs specific to terrestrial networks based on a subcarrier spacing of the communications with the network node or a subcarrier spacing group associated with the communications with the network node. In some examples, the offset component 745 may be configured as or otherwise support a means for selecting an offset from a set of offsets specific to the NTNs based on an orbit of the network node or an orbit group associated with the network node. In some examples, the RTT component 740 may be configured as or otherwise support a means for calculating the RLC layer RTT using the second RLC layer RTT and the offset, where the buffer size is calculated based on calculating the RLC layer RTT.

In some examples, the RTT component 740 may be configured as or otherwise support a means for selecting a second RLC layer RTT from a set of RLC layer RTTs specific to terrestrial networks based on a subcarrier spacing of the communications with the network node or a subcarrier spacing group associated with the communications with the network node. In some examples, the scalar component 750 may be configured as or otherwise support a means for selecting a scalar from a set of scalars specific to the NTNs based on an orbit of the network node or an orbit group associated with the network node. In some examples, the RTT component 740 may be configured as or otherwise support a means for calculating the RLC layer RTT using the second RLC layer RTT and the scalar, where the buffer size is calculated based on calculating the RLC layer RTT.

In some examples, the scalar is associated with a HARQ RTT associated with the orbit of the network node or the orbit group associated with the network node.

In some examples, the RTT component 740 may be configured as or otherwise support a means for calculating the RLC layer RTT using a second RLC layer RTT specific to terrestrial networks, an offset specific to the NTNs, and a scalar specific to the NTNs.

In some examples, the communications between the UE and the network node include communications according to a carrier aggregation for a set of serving cells associated with a set of network nodes of the NTN including the network node, each network node of the set of network nodes associated with a respective RLC layer RTT. In some examples, the RLC layer RTT used to calculate the buffer size corresponds to a largest RLC layer RTT associated with the set of network nodes.

In some examples, each serving cell of the set of serving cells is associated with a respective communication latency that is within a first range of communication latencies, each respective RLC layer RTT is within a second range of RLC layer RTTs, or both.

In some examples, the capability component 755 may be configured as or otherwise support a means for transmitting, to the network node, a capability message indicating a restriction of the carrier aggregation to serving cells associated with communication latencies within a first range of communication latencies, RLC layer RTTs within a second range of RLC layer RTTs, or both, where the carrier aggregation for the set of serving cells is based on the restriction.

In some examples, the UE is scheduled to receive data from a second set of serving cells that violate the indicated restriction, and the restriction component 760 may be configured as or otherwise support a means for discarding the received data based on the violation of the indicated restriction. In some examples, the UE is scheduled to receive data from a second set of serving cells that violate the indicated restriction, and the restriction component 760 may be configured as or otherwise support a means for transmitting, to the network node, an indication of the violation of the indicated restriction via an RLC layer NACK or a radio link failure message.

In some examples, the buffer size is further calculated based on a delay associated with communications between base stations in the NTN.

In some examples, the capability component 755 may be configured as or otherwise support a means for transmitting a capability message indicating an orbit of the network node that is supported by the UE, an orbit group associated with the network node that is supported by the UE, a latency of communications with the network node that is supported by the UE, or a combination thereof, where the connection is established with the network node based on the capability message.

In some examples, the RLC layer RTT is based on an orbit of the network node, the orbit of the network node including a GSO, a non-GSO, a GEO, a high earth orbit, an MEO, an LEO, a highly elliptical orbit, or an elevation of a high-altitude platform station.

In some examples, the buffer size is a layer 2 buffer size and the buffer is a layer 2 buffer.

Figure 8:
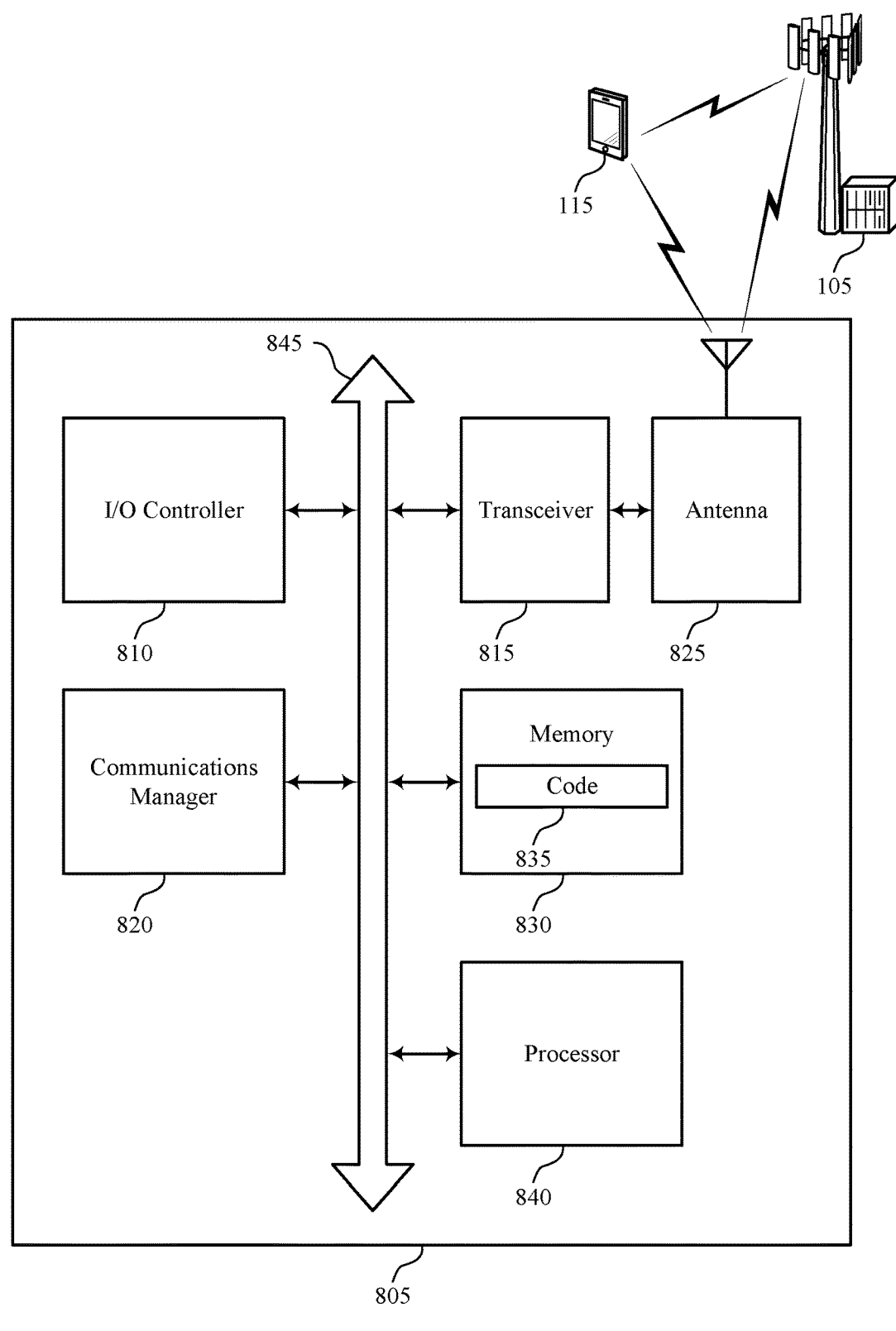
FIG. 8 shows a diagram of a system including a device that supports buffering techniques for NTNs in accordance with aspects of the present disclosure.

FIG. 8 shows a diagram of a system 800 including a device 805 that supports buffering techniques for NTNs in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting buffering techniques for NTNs). For example, the device 805 or a component of the device 805 may include a processor 840 and memory 830 coupled with or to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for establishing a connection with a network node via an NTN. The communications manager 820 may be configured as or otherwise support a means for calculating a buffer size for communications with the network node via the connection based on a maximum data rate of the connection and an RLC layer RTT, where the buffer size is specific to NTNs. The communications manager 820 may be configured as or otherwise support a means for buffing communications between the UE and the network node over the connection using a buffer in accordance with the calculated buffer size.

By including or configuring the communications manager 820 in accordance with examples as described herein, the device 805 may support techniques for improved data buffering and processing, memory overflow prevention, reduced latency, NTN communication buffering, improved communication scheduling, and improved coordination between devices, among other benefits.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of buffering techniques for NTNs as described herein, or the processor 840 and the memory 830 may be otherwise configured to perform or support such operations.

FIG. 9 shows a flowchart illustrating a method 900 that supports buffering techniques for NTNs in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include establishing a connection with a network node via an NTN. The operations of 905 may be performed in accordance with examples as disclosed herein. In some examples, aspects of the operations of 905 may be performed by a network connection component 725 as described with reference to FIG. 7.

At 910, the method may include calculating a buffer size for communications with the network node via the connection based at least in part on a maximum data rate of the connection and an RLC layer RTT, where the buffer size is specific to NTNs. The operations of 910 may be performed in accordance with examples as disclosed herein. In some examples, aspects of the operations of 910 may be performed by a buffer size component 730 as described with reference to FIG. 7.

At 915, the method may include buffering communications between the UE and the network node over the connection using a buffer in accordance with the calculated buffer size. The operations of 915 may be performed in accordance with examples as disclosed herein. In some examples, aspects of the operations of 915 may be performed by a buffer component 735 as described with reference to FIG. 7.

FIG. 10 shows a flowchart illustrating a method 1000 that supports buffering techniques for NTNs in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include establishing a connection with a network node via an NTN. The operations of 1005 may be performed in accordance with examples as disclosed herein. In some examples, aspects of the operations of 1005 may be performed by a network connection component 725 as described with reference to FIG. 7.

At 1010, the method may include selecting an RLC layer RTT from a set of RLC layer RTTs specific to the NTNs based at least in part on a subcarrier spacing of communications with the network node via the connection. The operations of 1010 may be performed in accordance with examples as disclosed herein. In some examples, aspects of the operations of 1010 may be performed by an RTT component 740 as described with reference to FIG. 7.

At 1015, the method may include calculating a buffer size for the communications with the network node based at least in part on a maximum data rate of the connection and the RLC layer RTT, where the buffer size is specific to NTNs. The operations of 1015 may be performed in accordance with examples as disclosed herein. In some examples, aspects of the operations of 1015 may be performed by a buffer size component 730 as described with reference to FIG. 7.

At 1020, the method may include buffering communications between the UE and the network node over the connection using a buffer in accordance with the calculated buffer size. The operations of 1020 may be performed in accordance with examples as disclosed herein. In some examples, aspects of the operations of 1020 may be performed by a buffer component 735 as described with reference to FIG. 7.

FIG. 11 shows a flowchart illustrating a method 1100 that supports buffering techniques for NTNs in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include establishing a connection with a network node via an NTN. The operations of 1105 may be performed in accordance with examples as disclosed herein. In some examples, aspects of the operations of 1105 may be performed by a network connection component 725 as described with reference to FIG. 7.

At 1110, the method may include selecting an RLC layer RTT from a set of RLC layer RTTs specific to the NTNs based at least in part on an orbit of the network node. The operations of 1110 may be performed in accordance with examples as disclosed herein. In some examples, aspects of the operations of 1110 may be performed by an RTT component 740 as described with reference to FIG. 7.

At 1115, the method may include calculating a buffer size for communications with the network node via the connection based at least in part on a maximum data rate of the connection and the RLC layer RTT, where the buffer size is specific to NTNs. The operations of 1115 may be performed in accordance with examples as disclosed herein. In some examples, aspects of the operations of 1115 may be performed by a buffer size component 730 as described with reference to FIG. 7.

At 1120, the method may include buffering communications between the UE and the network node over the connection using a buffer in accordance with the calculated buffer size. The operations of 1120 may be performed in accordance with examples as disclosed herein. In some examples, aspects of the operations of 1120 may be performed by a buffer component 735 as described with reference to FIG. 7.

Figure 12:
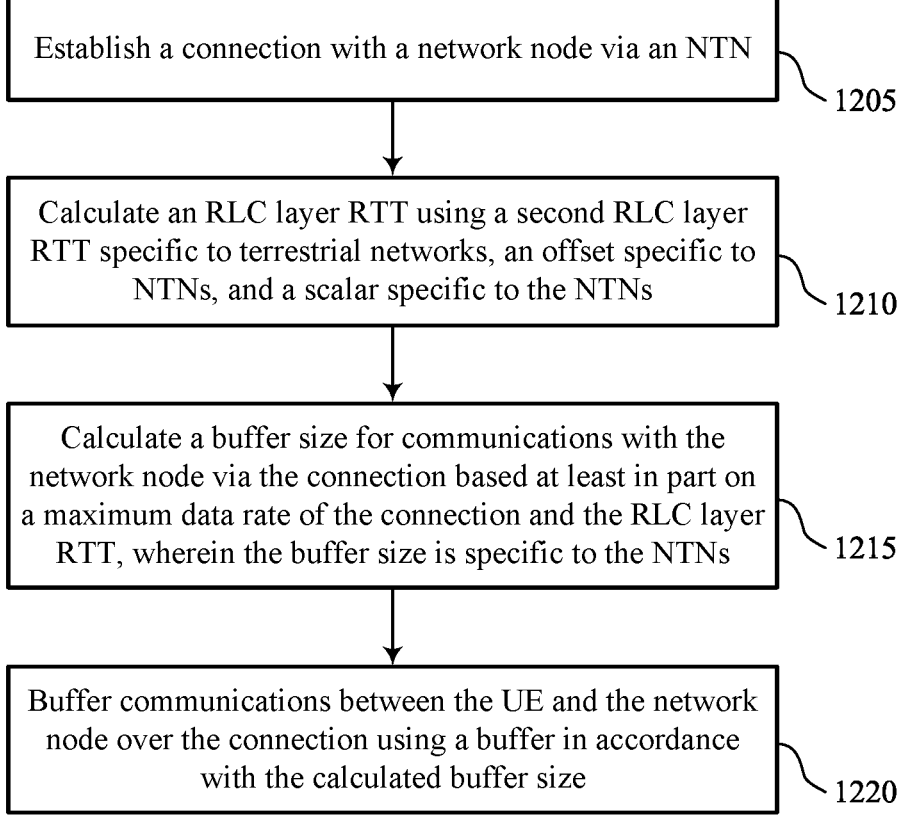

FIG. 12 shows a flowchart illustrating a method 1200 that supports buffering techniques for NTNs in accordance with aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1205, the method may include establishing a connection with a network node via an NTN. The operations of 1205 may be performed in accordance with examples as disclosed herein. In some examples, aspects of the operations of 1205 may be performed by a network connection component 725 as described with reference to FIG. 7.

At 1210, the method may include calculating an RLC layer RTT using a second RLC layer RTT specific to terrestrial networks, an offset specific to NTNs, and a scalar specific to the NTNs. The operations of 1210 may be performed in accordance with examples as disclosed herein. In some examples, aspects of the operations of 1210 may be performed by an RTT component 740 as described with reference to FIG. 7.

At 1215, the method may include calculating a buffer size for communications with the network node via the connection based at least in part on a maximum data rate of the connection and the RLC layer RTT, where the buffer size is specific to NTNs. The operations of 1215 may be performed in accordance with examples as disclosed herein. In some examples, aspects of the operations of 1215 may be performed by a buffer size component 730 as described with reference to FIG. 7.

At 1220, the method may include buffering communications between the UE and the network node over the connection using a buffer in accordance with the calculated buffer size. The operations of 1220 may be performed in accordance with examples as disclosed herein. In some examples, aspects of the operations of 1220 may be performed by a buffer component 735 as described with reference to FIG. 7.

The following provides an overview of aspects of the present disclosure:

Aspect 1: A method for wireless communication at a UE, comprising: establishing a connection with a network node via a NTN; calculating a buffer size for communications with the network node via the connection based at least in part on a maximum data rate of the connection and an RLC layer RTT, wherein the buffer size is specific to NTNs; and buffering communications between the UE and the network node over the connection using a buffer in accordance with the calculated buffer size.

Aspect 2: The method of aspect 1, further comprising: selecting the RLC layer RTT from a set of RLC layer RTTs specific to the NTNs based at least in part on a subcarrier spacing of the communications with the network node or a subcarrier spacing group associated with the communications with the network node, wherein the buffer size is calculated based at least in part on selecting the RLC layer RTT.

Aspect 3: The method of any of aspects 1 through 2, further comprising: selecting the RLC layer RTT from a set of RLC layer RTTs specific to the NTNs based at least in part on an orbit of the network node or an orbit group associated with the network node, wherein the buffer size is calculated based at least in part on selecting the RLC layer RTT.

Aspect 4: The method of aspect 1, further comprising: selecting a second RLC layer RTT from a set of RLC layer RTTs specific to terrestrial networks based at least in part on a subcarrier spacing of the communications with the network node or a subcarrier spacing group associated with the communications with the network node; selecting an offset from a set of offsets specific to the NTNs based at least in part on an orbit of the network node or an orbit group associated with the network node; and calculating the RLC layer RTT using the second RLC layer RTT and the offset, wherein the buffer size is calculated based at least in part on calculating the RLC layer RTT.

Aspect 5: The method of any of aspects 1 and 4, further comprising: selecting a second RLC layer RTT from a set of RLC layer RTTs specific to terrestrial networks based at least in part on a subcarrier spacing of the communications with the network node or a subcarrier spacing group associated with the communications with the network node; selecting a scalar from a set of scalars specific to the NTNs based at least in part on an orbit of the network node or an orbit group associated with the network node; and calculating the RLC layer RTT using the second RLC layer RTT and the scalar, wherein the buffer size is calculated based at least in part on calculating the RLC layer RTT.

Aspect 6: The method of aspect 5, wherein the scalar is associated with a hybrid automatic repeat request RTT associated with the orbit of the network node or the orbit group associated with the network node.

Aspect 7: The method of any of aspects 1 and 4 through 6, further comprising: calculating the RLC layer RTT using a second RLC layer RTT specific to terrestrial networks, an offset specific to the NTNs, and a scalar specific to the NTNs.

Aspect 8: The method of any of aspects 1 through 7, wherein the communications between the UE and the network node comprise communications according to a carrier aggregation for a set of serving cells associated with a set of network nodes of the NTN comprising the network node, each network node of the set of network nodes associated with a respective RLC layer RTT, and the RLC layer RTT used to calculate the buffer size corresponds to a largest RLC layer RTT associated with the set of network nodes.

Aspect 9: The method of aspect 8, wherein each serving cell of the set of serving cells is associated with a respective communication latency that is within a first range of communication latencies, each respective RLC layer RTT is within a second range of RLC layer RTTs, or both.

Aspect 10: The method of any of aspects 8 through 9, further comprising: transmitting, to the network node, a capability message indicating a restriction of the carrier aggregation to serving cells associated with communication latencies within a first range of communication latencies, RLC layer RTTs within a second range of RLC layer RTTs, or both, wherein the carrier aggregation for the set of serving cells is based at least in part on the restriction.

Aspect 11: The method of aspect 10, wherein the UE is scheduled to receive data from a second set of serving cells that violate the indicated restriction, the method further comprising: discarding the received data based at least in part on the violation of the indicated restriction; and transmitting, to the network node, an indication of the violation of the indicated restriction via an RLC layer NACK or a radio link failure message.

Aspect 12: The method of any of aspects 1 through 11, wherein the buffer size is further calculated based at least in part on a delay associated with communications between base stations in the NTN Aspect 13: The method of any of aspects 1 through 12, further comprising: transmitting a capability message indicating an orbit of the network node that is supported by the UE, an orbit group associated with the network node that is supported by the UE, a latency of communications with the network node that is supported by the UE, or a combination thereof, wherein the connection is established with the network node based at least in part on the capability message.

Aspect 14: The method of any of aspects 1 through 13, wherein the RLC layer RTT is based at least in part on an orbit of the network node, the orbit of the network node comprising a GSO, a non-GSO, a GEO, a high earth orbit, an MEO, an LEO, a highly elliptical orbit, or an elevation of a HAPS.

Aspect 15: The method of any of aspects 1 through 14, wherein the buffer size is a layer 2 buffer size and the buffer is a layer 2 buffer.

Aspect 16: An apparatus for wireless communication at a UE, comprising a processor; memory coupled with the processor; and instructions stored in the memory and executable by the processor to cause the apparatus to perform a method of any of aspects 1 through 15.

Aspect 17: An apparatus for wireless communication at a UE, comprising at least one means for performing a method of any of aspects 1 through 15.

Aspect 18: A non-transitory computer-readable medium storing code for wireless communication at a UE, the code comprising instructions executable by a processor to perform a method of any of aspects 1 through 15.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:

at least one processor; and at least one memory coupled with the at least one processor, with instructions stored in the at least one memory, the instructions being executable by the at least one processor, individually or in any combination, to cause the apparatus to:

transmit a capability message indicating a latency of communications that is supported by the UE;

establish a connection with a network node via a non-terrestrial network (NTN) based on the capability message; and buffer NTN communications between the UE and the network node over the connection using a buffer having an NTN buffer size that is based at least in part on a radio link control (RLC) layer round trip time (RTT) for the NTN, wherein the RLC RTT for the NTN is associated with the NTN communications between the UE and the network node, wherein the RLC RTT for the NTN is determined based at least in part on an RLC RTT for a terrestrial network associated with the UE and on one or both of an offset for calculating the RLC RTT for the NTN and a scalar for calculating the RLC RTT for the NTN, wherein the RLC RTT for the terrestrial network is selected from a set of RLC RTTs for the terrestrial network based at least in part on a subcarrier spacing of the communications with the network node or a subcarrier spacing group associated with the communications with the network node, and wherein the scalar is selected from a set of scalars for the NTN based at least in part on an orbit of the network node or an orbit group associated with the network node.

2. The apparatus of claim 1, wherein the instructions are further executable by the at least one processor, individually or in any combination, to cause the apparatus to:

select the RLC RTT for the NTN from a set of RLC RTTs for the NTN based at least in part on the subcarrier spacing of the communications with the network node or the subcarrier spacing group associated with the communications with the network node, wherein the NTN buffer size is determined based at least in part on selecting the RLC RTT for the NTN.

3. The apparatus of claim 1, wherein the instructions are further executable by the at least one processor, individually or in any combination, to cause the apparatus to:

select the RLC RTT for the NTN from a set of RLC RTTs for the NTN based at least in part on the orbit of the network node or the orbit group associated with the network node, wherein the NTN buffer size is determined based at least in part on selecting the RLC RTT for the NTN.

4. The apparatus of claim 1, wherein the instructions are further executable by the at least one processor, individually or in any combination, to cause the apparatus to:

select the offset from a set of offsets for the NTN based at least in part on the orbit of the network node or the orbit group associated with the network node; and determine the RLC RTT for the NTN using the RLC RTT for the terrestrial network and the offset, wherein the NTN buffer size is determined based at least in part on determining the RLC RTT for the NTN.

5. The apparatus of claim 1, wherein the scalar is associated with a hybrid automatic repeat request RTT associated with the orbit of the network node or the orbit group associated with the network node.

6. The apparatus of claim 1, wherein the instructions are further executable by the at least one processor, individually or in any combination, to cause the apparatus to:

determine the RLC RTT for the NTN using the RLC RTT for the terrestrial network, the offset, and the scalar.

7. The apparatus of claim 1, wherein:

the communications between the UE and the network node comprise communications according to a carrier aggregation for a set of serving cells associated with a set of network nodes of the NTN comprising the network node, each network node of the set of network nodes associated with a respective RLC RTT, and the RLC RTT for the NTN used to determine the NTN buffer size corresponds to a largest RLC RTT associated with the set of network nodes.

8. The apparatus of claim 7, wherein each serving cell of the set of serving cells is associated with a respective communication latency that is within a first range of communication latencies, each respective RLC RTT is within a second range of RLC RTT, or both.

9. The apparatus of claim 7, wherein the capability message further indicates:

a restriction of the carrier aggregation to serving cells associated with communication latencies within a first range of communication latencies, RLC RTTs within a second range of RLC RTTs, or both, wherein the carrier aggregation for the set of serving cells is based at least in part on the restriction.

10. The apparatus of claim 9, wherein the UE is scheduled to receive data from a second set of serving cells that violate the indicated restriction, and the instructions are further executable by the at least one processor, individually or in any combination, to cause the apparatus to:

discard the received data based at least in part on the violation of the indicated restriction; and transmit, to the network node, an indication of the violation of the indicated restriction via a RLC layer negative acknowledgement or a radio link failure message.

11. The apparatus of claim 1, wherein the NTN buffer size is further determined based at least in part on a delay associated with communications between base stations in the NTN.

12. The apparatus of claim 1, wherein the further indicates that the UE supports the orbit of the network node, the orbit group associated with the network node, or both.

13. The apparatus of claim 1, wherein the RLC RTT for the NTN is based at least in part on the orbit of the network node, the orbit of the network node comprising a geosynchronous orbit, a non-geosynchronous orbit, a geostationary earth orbit, a high earth orbit, a medium earth orbit, a low earth orbit, a highly elliptical orbit, or an elevation of a high-altitude platform station.

14. The apparatus of claim 1, wherein the NTN buffer size is a layer 2 buffer size and the buffer is a layer 2 buffer.

15. A method for wireless communication at a user equipment (UE), comprising:

transmitting a capability message indicating a latency of communications that is supported by the UE;

establishing a connection with a network node via a non-terrestrial network (NTN) based on the capability message; and buffering NTN communications between the UE and the network node over the connection using a buffer having an NTN buffer size that is based at least in part on a radio link control (RLC) layer round trip time (RTT)

for the NTN, wherein the RLC RTT for the NTN is associated with the NTN communications between the UE and the network node, wherein the RLC RTT for the NTN is determined based at least in part on an RLC RTT for a terrestrial network associated with the UE and on one or both of an offset for calculating the RLC RTT for the NTN and a scalar for calculating the RLC RTT for the NTN, wherein the RLC RTT for the terrestrial network is selected from a set of RLC RTTs for the terrestrial network based at least in part on a subcarrier spacing of the communications with the network node or a subcarrier spacing group associated with the communications with the network node, and wherein the scalar is selected from a set of scalars for the NTN based at least in part on an orbit of the network node or an orbit group associated with the network node.

16. The method of claim 15, further comprising:
selecting the RLC RTT for the NTN from a set of RLC RTTs for the NTN based at least in part on the subcarrier spacing of the communications with the network node or the subcarrier spacing group associated with the communications with the network node, wherein the NTN buffer size is determined based at least in part on selecting the RLC RTT for the NTN.

17. The method of claim 15, further comprising:
selecting the RLC RTT for the NTN from a set of RLC RTTs for the NTN based at least in part on the orbit of the network node or the orbit group associated with the network node, wherein the NTN buffer size is determined based at least in part on selecting the RLC RTT for the NTN.

18. The method of claim 15, further comprising:
selecting the offset from a set of offsets for the NTN based at least in part on the orbit of the network node or the orbit group associated with the network node; and
determining the RLC RTT for the NTN using the RLC RTT for the terrestrial network and the offset, wherein the NTN buffer size is determined based at least in part on determining the RLC RTT for the NTN.

19. The method of claim 15, wherein the scalar is associated with a hybrid automatic repeat request RTT associated with the orbit of the network node or the orbit group associated with the network node.

20. The method of claim 15, further comprising:
determining the RLC RTT for the NTN using the RLC RTT for the terrestrial network, the offset, and the scalar.

21. The method of claim 15, wherein:
the communications between the UE and the network node comprise communications according to a carrier aggregation for a set of serving cells associated with a set of network nodes of the NTN comprising the network node, each network node of the set of network nodes associated with a respective RLC RTT, and the RLC RTT for the NTN used to determine the NTN buffer size corresponds to a largest RLC RTT associated with the set of network nodes.

22. The method of claim 21, wherein each serving cell of the set of serving cells is associated with a respective communication latency that is within a first range of communication latencies, each respective RLC RTT is within a second range of RLC RTTs, or both.

23. The method of claim 21, the capability message further indicating:
a restriction of the carrier aggregation to serving cells associated with communication latencies within a first range of communication latencies, RLC RTTs within a second range of RLC RTTs, or both, wherein the carrier aggregation for the set of serving cells is based at least in part on the restriction.

24. The method of claim 23, wherein the UE is scheduled to receive data from a second set of serving cells that violate the indicated restriction, the method further comprising:
discarding the received data based at least in part on the violation of the indicated restriction; and
transmitting, to the network node, an indication of the violation of the indicated restriction via a RLC layer negative acknowledgement or a radio link failure message.

25. The method of claim 15, wherein the NTN buffer size is further determined based at least in part on a delay associated with communications between base stations in the NTN.

26. The method of claim 15, the capability message further indicating:
the orbit of the network node, the orbit group associated with the network node, or both, wherein the orbit of the network node and the orbit group associated with the network node are supported by the UE.

27. An apparatus for wireless communication at a user equipment (UE), comprising:
means for transmitting a capability message indicating a latency of communications that is supported by the UE;
means for establishing a connection with a network node via a non-terrestrial network (NTN) based on the capability message; and
means for buffering NTN communications between the UE and the network node over the connection using a buffer having an NTN buffer size that is based at least in part on a radio link control (RLC) layer round trip time (RTT) for the NTN, wherein the RLC RTT for the NTN is associated with the NTN communications between the UE and the network node, wherein the RLC RTT for the NTN is determined based at least in part on an RLC RTT for a terrestrial network associated with the UE and on one or both of an offset for calculating the RLC RTT for the NTN and a scalar for calculating the RLC RTT for the NTN, wherein the RLC RTT for the terrestrial network is selected from a set of RLC RTTs for the terrestrial network based at least in part on a subcarrier spacing of the communications with the network node or a subcarrier spacing group associated with the communications with the network node, and wherein the scalar is selected from a set of scalars for the NTN based at least in part on an orbit of the network node or an orbit group associated with the network node.

28. A non-transitory computer-readable medium storing code for wireless communication at a user equipment (UE), the code comprising instructions executable by a processor to:
transmit a capability message indicating a latency of communications that is supported by the UE;
establish a connection with a network node via a non-terrestrial network (NTN) based on the capability message; and
buffer NTN communications between the UE and the network node over the connection using a buffer having an NTN buffer size that is based at least in part on a radio link control (RLC) layer round trip time (RTT) for the NTN, wherein the RLC RTT for the NTN is associated with the NTN communications between the UE and the network node, wherein the RLC RTT for the NTN is determined based at least in part on an RLC RTT for a terrestrial network associated with the UE and on one or both of an offset for calculating the RLC RTT for the NTN and a scalar for calculating the RLC RTT for the NTN, wherein the RLC RTT for the terrestrial network is selected from a set of RLC RTTs for the terrestrial network based at least in part on a subcarrier spacing of the communications with the network node or a subcarrier spacing group associated with the communications with the network node, and wherein the scalar is selected from a set of scalars for the NTN based at least in part on an orbit of the network node or an orbit group associated with the network node.

\* \* \* \* \*